United States Patent
Chen

(10) Patent No.: US 10,839,157 B2
(45) Date of Patent: Nov. 17, 2020

(54) CANDIDATE IDENTIFICATION AND MATCHING

(71) Applicant: Talentful Technology Inc., Vancouver (CA)

(72) Inventor: Jia Chen, Vancouver (CA)

(73) Assignee: Talentful Technology Inc., Vancouver (CA)

(*) Notice: Subject to any disclaimer, the term of this patent is extended or adjusted under 35 U.S.C. 154(b) by 104 days.

(21) Appl. No.: 16/146,635

(22) Filed: Sep. 28, 2018

(65) Prior Publication Data

US 2019/0108217 A1 Apr. 11, 2019

Related U.S. Application Data

(60) Provisional application No. 62/569,700, filed on Oct. 9, 2017.

(51) Int. Cl.
| | |
|---|---|
| *G06F 40/289* | (2020.01) |
| *G06Q 10/10* | (2012.01) |
| *G06F 40/30* | (2020.01) |
| *G06F 40/205* | (2020.01) |
| *G06F 40/268* | (2020.01) |
| *G06F 40/35* | (2020.01) |

(52) U.S. Cl.
CPC .......... *G06F 40/289* (2020.01); *G06F 40/205* (2020.01); *G06F 40/268* (2020.01); *G06F 40/30* (2020.01); *G06F 40/35* (2020.01); *G06Q 10/1053* (2013.01)

(58) Field of Classification Search
CPC ........ G06F 40/00; G06F 40/20; G06F 40/205; G06F 40/211; G06F 40/268; G06F 40/284; G06F 40/289; G06F 40/30; G06F 40/35; G06F 16/3331; G06F 16/3332; G06F 16/3344
See application file for complete search history.

(56) References Cited

U.S. PATENT DOCUMENTS

| | | | | | |
|---|---|---|---|---|---|
| 4,879,648 | A * | 11/1989 | Cochran | ............. | G06F 16/2428 |
| | | | | | 715/841 |
| 5,940,821 | A * | 8/1999 | Wical | .................. | G06F 16/3338 |
| 6,460,029 | B1 * | 10/2002 | Fries | .................... | G06F 16/3329 |
| 6,633,868 | B1 * | 10/2003 | Min | ........................ | G06F 16/951 |
| 7,117,432 | B1 * | 10/2006 | Shanahan | ............. | G06F 16/353 |
| | | | | | 715/210 |
| 7,197,451 | B1 * | 3/2007 | Carter | ..................... | G06F 40/30 |
| | | | | | 704/10 |
| 8,019,764 | B1 * | 9/2011 | Nucci | .................. | G06F 16/951 |
| | | | | | 707/739 |
| 2002/0055916 | A1 * | 5/2002 | Jost | ................... | G06F 16/90332 |

(Continued)

*Primary Examiner* — Eric Yen
(74) *Attorney, Agent, or Firm* — Perkins Coie LLP

(57) ABSTRACT

Candidate identification and matching for professional positions, and associated systems and methods are disclosed herein. A representative method includes obtaining first key phrase groups based on textual input, converting the first key phrase groups into vectors defined in accordance with a collection of key phrases, generating a set of topics based on the vectors, generating second key phrase groups based on an association between individual topics of the set of topics and the collection of key phrases, and identifying documentation associated with one or more candidates for a professional position based on the second key phrase groups.

20 Claims, 15 Drawing Sheets

(56) References Cited

U.S. PATENT DOCUMENTS

| | | | |
|---|---|---|---|
| 2002/0129015 A1* | 9/2002 | Caudill | G06F 16/353 |
| 2005/0125216 A1* | 6/2005 | Chitrapura | G06F 40/30 704/1 |
| 2006/0080084 A1* | 4/2006 | Shuster | G06F 40/20 704/9 |
| 2006/0184481 A1* | 8/2006 | Zhang | G06F 16/313 706/45 |
| 2007/0106657 A1* | 5/2007 | Brzeski | G06F 16/367 |
| 2009/0150827 A1* | 6/2009 | Meyer | G06F 16/9535 715/810 |
| 2010/0299332 A1* | 11/2010 | Dassas | G06K 9/00456 707/741 |
| 2011/0047159 A1* | 2/2011 | Baid | G06F 16/355 707/738 |
| 2011/0072047 A1* | 3/2011 | Wang | G06F 16/58 707/776 |
| 2015/0213492 A1* | 7/2015 | Aleksandrovsky | G06F 16/3322 705/14.53 |
| 2015/0248478 A1* | 9/2015 | Skupin | G06F 16/367 707/609 |
| 2015/0317610 A1* | 11/2015 | Rao | G06Q 10/10 705/321 |
| 2015/0347392 A1* | 12/2015 | Cavalin | G06F 40/284 704/9 |
| 2016/0217488 A1* | 7/2016 | Ward | G06F 16/313 |
| 2017/0017635 A1* | 1/2017 | Leliwa | G06F 40/30 |
| 2019/0073420 A1* | 3/2019 | Agapiev | G06F 16/9024 |

\* cited by examiner

FIG. 9B

CANDIDATE IDENTIFICATION AND MATCHING

This application claims the benefit of and priority to U.S. Provisional Patent Application No. 62/569,700, filed Oct. 9, 2017, entitled "CANDIDATE IDENTIFICATION AND MATCHING," which application is incorporated by reference herein in its entirety.

BACKGROUND

Finding qualified candidates for various job positions (e.g. software engineer positions) is a tedious and lengthy process. Recruiters and hiring managers typically perform key-phrase searches on resumes, Linkedin.com, as well as job hunting sites to discover potential candidates. Key-phrase searches can be time consuming, inaccurate, and unreliable in identifying candidates. Use software engineer jobs as an example, in recent years, as software development tools, frameworks, and programming languages evolve, the number of relevant key-phrases keeps increasing while their relationship becomes more complex. Illustratively, when recruiters and hiring managers search for "coffee" (short for Coffee Script, a type of programming language) on Linkedin.com, people wrote "drinking coffee" on their profile page would also be listed on the key-phrase search result. Accordingly, there is a need for an efficient and effective system for identifying and/or matching candidates for various roles using increasingly complex information.

BRIEF DESCRIPTION OF THE DRAWINGS

FIG. 8 illustrates two scenario examples: 1) when the user(s) has never used the system, and 2) when the user(s) has interacted with the system, which therefore has certain level of knowledge of the users' preference for different types of profiles and the profiles' relevancy to previous specific job requirements. Under these two scenarios, the system, according to some embodiments, can use two different methods to sort the profiles to be displayed in front of the user(s).

FIG. 9B illustrates an example user interface of a ranked list of qualified candidates being displayed to users, in accordance with some embodiments of the presently disclosed technology.

DETAILED DESCRIPTION

Figure 1:
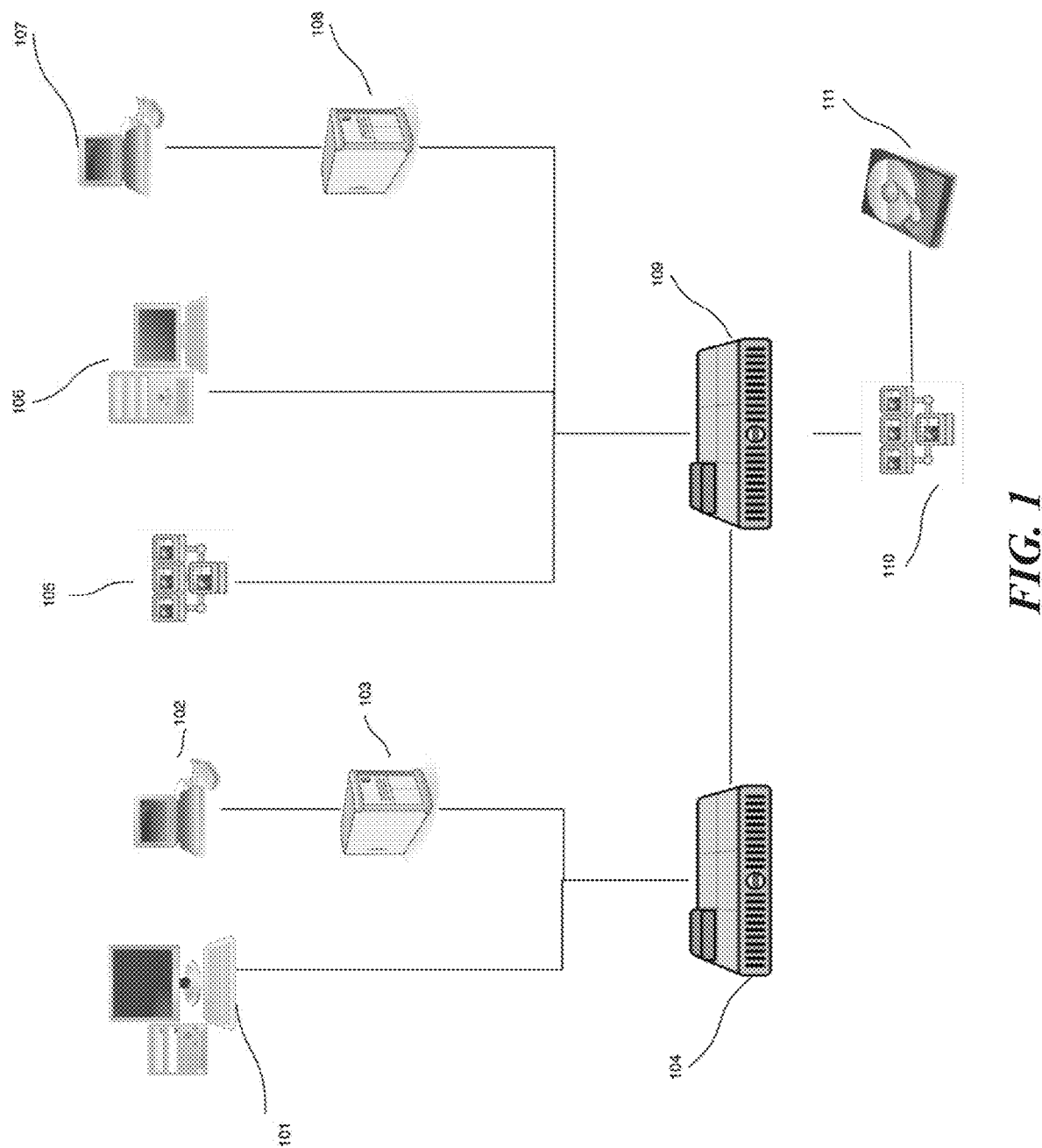
FIG. 1 is a block diagram of a system including user devices configured to communicate with host server(s) for discovering qualified candidates, and the host servers configured to gather publications of potential candidates and communicate with a network of computer to analyze the publications, in accordance with some embodiments of the presently disclosed technology.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment," "an embodiment," or "some embodiments" means that a particular feature, structure, or characteristic described in connection with the embodiment is included in at least one embodiment of the disclosure. The appearances of the phrase "in some embodiments" in various places in the specification are not necessarily all referring to the same embodiments, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various examples of the presently disclosed technology will now be described. The following description provides certain specific details for a thorough understanding and enabling description of these examples. One skilled in the relevant technology will understand, however, that the presently disclosed technology may be practiced without many of these details. Likewise, one skilled in the relevant technology will also understand that the presently disclosed technology may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

As discussed above, key-phrase searches can be time consuming, inaccurate, and unreliable in identifying candidates that can potentially match requirements of specific job positions or other specifically defined roles. For example, key-phrase searches can include anyone who list certain key phrases casually on their resumes or Linkedin profile pages. End users (e.g. recruiters, hiring managers, etc.) may find it difficult to validate the search results within a timely manner using often limited resources. Additionally, key-phrase searches may fail to identify well-qualified candidates due to its inflexibility. For example, companies may be interested in hiring candidates with related skills who might not acquire the exact skills as prescribed. Strict keywords matching search can be highly ineffective in this regard. Illustratively, when searching for "node.js", and "angular.js" on Linkedin.com, candidates who possess skills in "backbone.js" and "ember.js" are ignored. Nevertheless, all these skills are closely related and transferable.

The embodiments described herein relate generally to candidate identification and matching. More specifically, the presently disclosed technology includes computer-implemented methods and systems for identifying candidates qualified for job positions (e.g. software engineer job positions) by efficiently and accurately integrating and analyzing a large amount of data from the Internet and/or other data sources. According to some embodiments, the system can identify candidates from websites, social networks (e.g. related to software development where users are active), applicants applied through web portals hosted by employers, or contacts referred by contributors (e.g. employee referrals). The system can employ multiple portions of the system and subsystems to determine the qualification of these candidates by analyzing both the job requirements as well as the publication and resumes of the candidates. The assessment of job requirements, according to some embodiments, can leverage multiple portions of the system to predict related key phrases to the software development skills listed. The assessment of the candidates, according to some embodiments, can use multiple portions of the system to gather publication, analyze the publications, extrapolate insights from the publications, match the candidates with the assessed job requirements and rank the candidates based on users' preferences.

FIG. 1 illustrates a block diagram of user devices (101, 106) and/or user devices that host Applicant Tracking System (102, 107) communicating with host servers (104, 109)

for discovering qualified candidates that match a specific job requirement(s) in an online environment, according to some embodiments.

The plurality of user devices (101, 106, 102, 107) can be any system and/or device, and/or any combination of devices/systems that is able to establish a connection with another device, a server and/or other systems. The user devices (101, 106, 102, 107) typically include display or other output functionalities to present data exchanged between devices to a user. For example, the user devices can include, but are not limited to, a server desktop, a desktop computer, a computer cluster, a mobile computing device such as a notebook, a laptop, a mobile phone, a smartphone, a PDA, etc. The connection among different elements illustrated in FIG. 1 can be achieved via, for example, LAN, Wireless Local Area Network (WLAN), a personal Network (PAN), a campus area network (CAN, a metropolitan area network (MAN), a wide area network (WAN), a wireless wide area network (WWAN), Global System for Mobile Communications (GSM), Personal Communications Service (PCS), Digital Advanced Mobile Phone Service (D-Amps), Wi-Fi, Fixed Wireless Data, 2G, 2.5G, 3G, 4G, 5G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC or any other wireless data network or messaging protocols.

Figure 9A:
FIG. 9A describes an example user interface showing the relevant users have entered key skill requirements and other related criteria so the system can use to determine the qualification of candidates, in accordance with some embodiments of the presently disclosed technology.
Figure 9C:
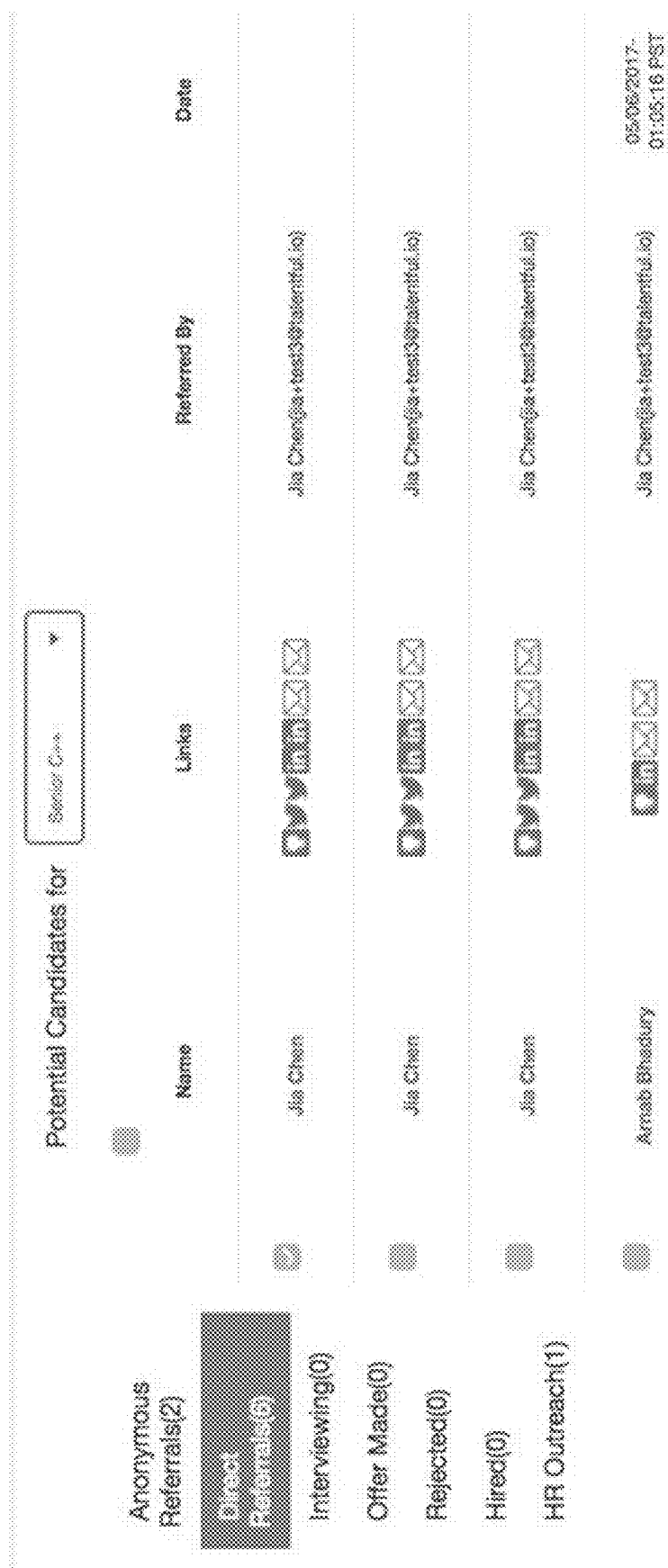
FIG. 9C illustrates another example user interface of a ranked list of qualified candidates being displayed to users, in accordance with some embodiments of the presently disclosed technology.
Figure 10:
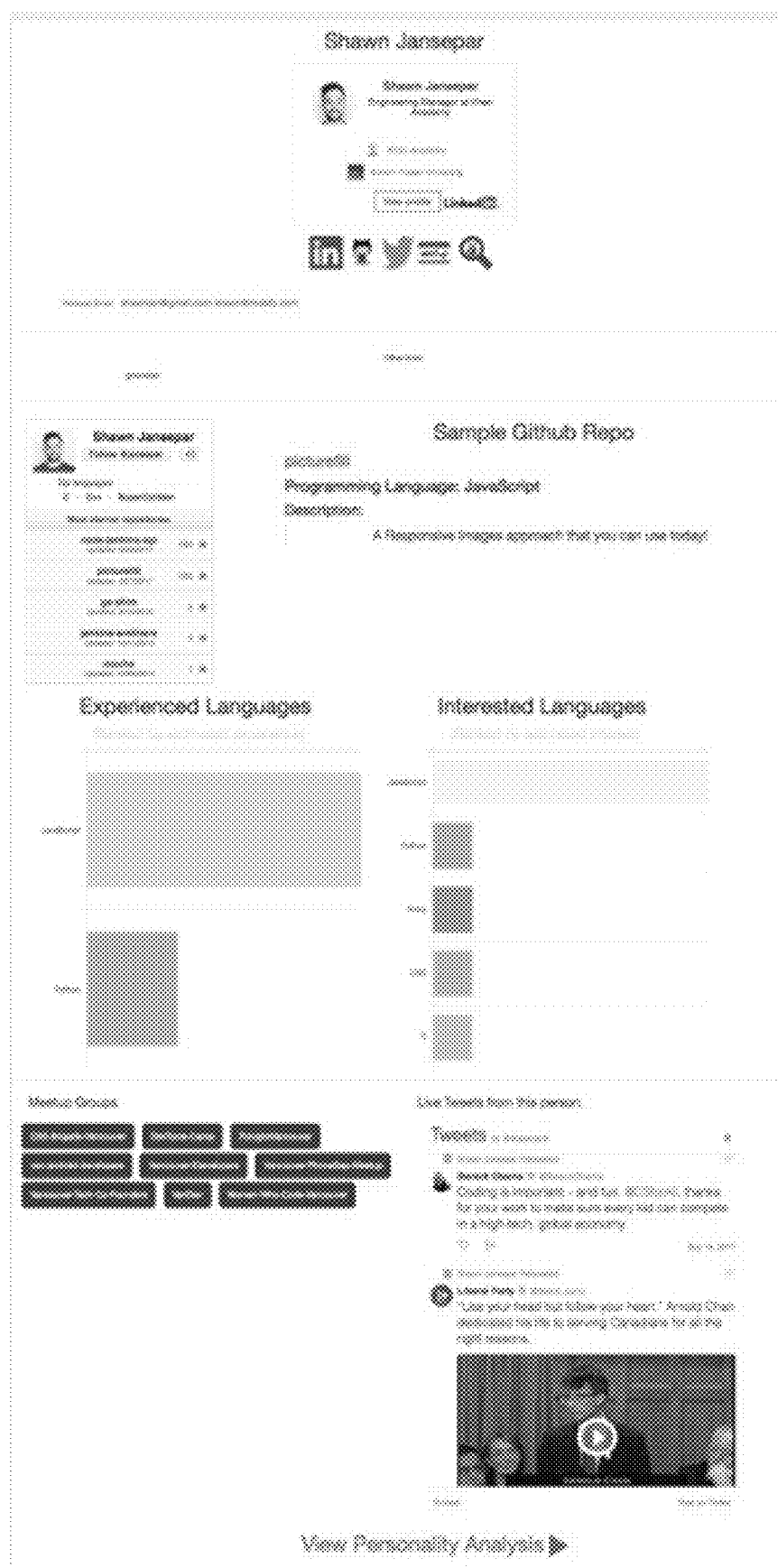
FIG. 10 illustrates an example user interface of a candidate profile with insights generated by the system, in accordance with some embodiments of the presently disclosed technology.

The user device (101) can provide users a user interface to enter job requirements, which the system uses to match with and rank qualified candidates. FIG. 9A illustrates an example of such a user interface, hosted on the device, for users to enter job requirements. The user device can also be used to provide a user interface to display the ranked candidates to the user. FIG. 9B and FIG. 9C demonstrate two examples of user interfaces where lists of qualified candidates are ranked and displayed to the end user. The user device can also display insights, such as textual, quantifiable, and/or graphical information that rates or otherwise evaluates individual candidates. The system can synthesize, compile, consolidate, or otherwise derive insights from the profiles or other raw data of individual qualified candidates, to assist the users in making a hiring decision. FIG. 10 demonstrates an example of a user interface where insights concerning software development skills are displayed to the users.

Figure 11:
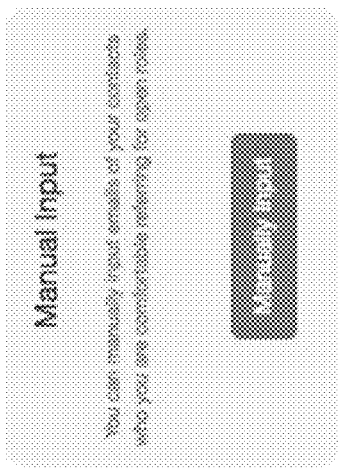
FIG. 11 depicts an example user interface where contributors can enter their contact lists to the system, which in return can discover potential candidates that match specific job requirements, in accordance with some embodiments of the presently disclosed technology.
Figure 11:
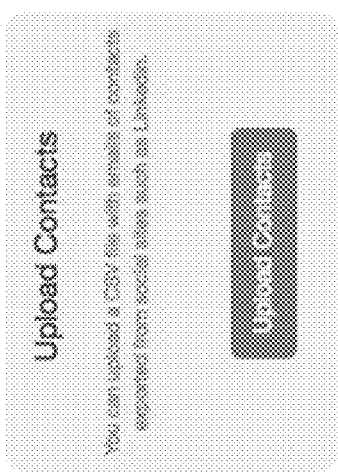
Figure 11:
Figure 11:
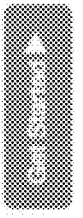
Figure 11:
Figure 11:
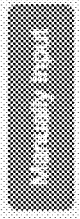

The user device (106) can provide contributors with a user interface to enter employee referrals or contact lists for the system to automatically discover qualified candidates. FIG. 11 illustrates an example of a user interface where users can enter a list of contacts for the system to discover candidates.

The user devices (102, 107) that host Applicant Tracking System (ATS) can be any system and/or devices, and/or any combination of devices/systems that can establish connection with another server, provide user interface to users to enter and store job requirements as well as user interface for potential candidates to submit resume. Examples of ATS can include but are not limited to systems such as Jobvite, Jobscore, Greehouse, Lever, Jazz, ICIMS, Taleo, etc.

The user device 102 (also referred to as "ATS host server") can provide user interface(s) that enables users to enter job requirement and view a list of qualified candidates. The user device can establish a connection with a host server by leveraging an integration server (103) via network connection.

The integration device 103 is an intermediate device that communicates with ATS host server 102 and host server 104. The integration device 103 can include a display device to display progress. The integration device 103 can also be embodied as a program that runs on host server 102 or host server 104. In some embodiments, the integration device 103 separates the direct communication between system host server and ATS to enhance simultaneous computing, data security, and/or user experience. Illustratively, the integration device 103 can receive a list of job requirements and send to host server 104 to be processed, and in return, send a list of qualified, ranked candidate profiles back to host server 102.

In some embodiments, the host server 104 primarily provides and, in some cases, displays data to end users as well as integration device 103 that enhance data in ATS hosted on device 102. The host server 104 can transmit and receive data from another server (109), which primarily works with other devices to collect and/or analyze data. According to some embodiments, servers 104 and 109 can be one or multiple devices.

The user device 107 is a device that hosts ATS, similar to user device 102. In some embodiments, the user devices 102 and 107 are the same device. User device 107 primarily hosts ATS that provides a list of candidates to be qualified and ranked while user device 102 hosts ATS that stores details of job requirements.

The integration device 108 is similar to device 103. The integration device 108 can transmit and receive data between host server 109 and the user device 107, where ATS is hosted. Illustratively, the integration device 108 can receive a list of resumes of potential candidates and send to host server 109 to be processed, and in return, send a list of qualified, ranked candidate profiles back to host device 107. According to some embodiments, devices 103 and 108 can be the same device.

The plurality of devices 105 can be any systems, and/or device or a combination of devices/systems that is able to communicate with servers, which hosts and store data of websites including but not limited to: social networks, academic publications, blogs, personal websites, open source code and discussion forums. The device 105 can communicate with these servers via connections similar to the connection used by device 101 and device 104. Device 105 can collect data from these host servers and send to host server 109 to be processed.

The device 109 leverages the device 110 to process and analyze data collected from devices 105, 106 and/or 107. The plurality of devices 110 can be systems, devices or a combination of devices/systems which employ programs to analyze textual data, code, or the like, and generate insights related to professional skill sets. The device(s) 110 can be the same as device 109, according to some embodiments, although multiple devices can speed up the process and enhance security.

The device 110 leverages the data repository 111 to store data. The data repository 111 can be implemented via object-oriented technology and/or via text files, and can be managed by a distributed data repository management system (e.g. Apache Spark, Apache Hadoop), an object-oriented database management system (OODBMS) (e.g. ConceptBase, FastDB), an object-relational database management system (ORDBMS) (e.g. Informix, Openlink, Postgres, MySQL, SQL Server, MongoDB), a file system, and/or any other convenient or known database management package.

In some embodiments, the device 110 can provide data to be stored in the data repository 111 and/or can retrieve data stored in the data repository 111. The user data repository 111 can store static data including but not limited to job description, user email, user name, users' employers, contact information, payment information etc. In some embodiments, user data stored in the data repository is explicitly specified by the user. For example, when the user signs up for services, a set of information such as a valid email address, a billing address, credit card information, and/or location, may be required.

The device 111 can also store static information of potential candidates including but not limited to their online profiles, resumes and publications. For example, such type of data can include candidates' resumes, blogs, writings, profiles on online forum, profiles on social networks, open source code, abstracts and excerpts of academic publications. The data repository can store such information per the specification explicitly defined by the administrator of the system or in their original format. For example, the system can store raw source code acquired from open source website as well as summary information such as quality, number of bugs, programming languages, software development frameworks used in the code, generated by running simulation of the source code in a virtual environment in accordance with the specification of the administrator.

The data repository 111 can also store dynamic data. Dynamic data can either be explicitly submitted by the user or provided via one or more software agents and/or hardware modules on device 101, device 104, device 106, and/or device 109. For example, a user can periodically interact with the system, as such, the user preferences and interaction with the system are recorded and the data is stored on data repository 111. As another example, a potential candidate may periodically update his online profile, and the snapshots of his online profile acquired by device 105 is constantly recorded, merged with existing record and stored in data repository 111.

Figure 2:
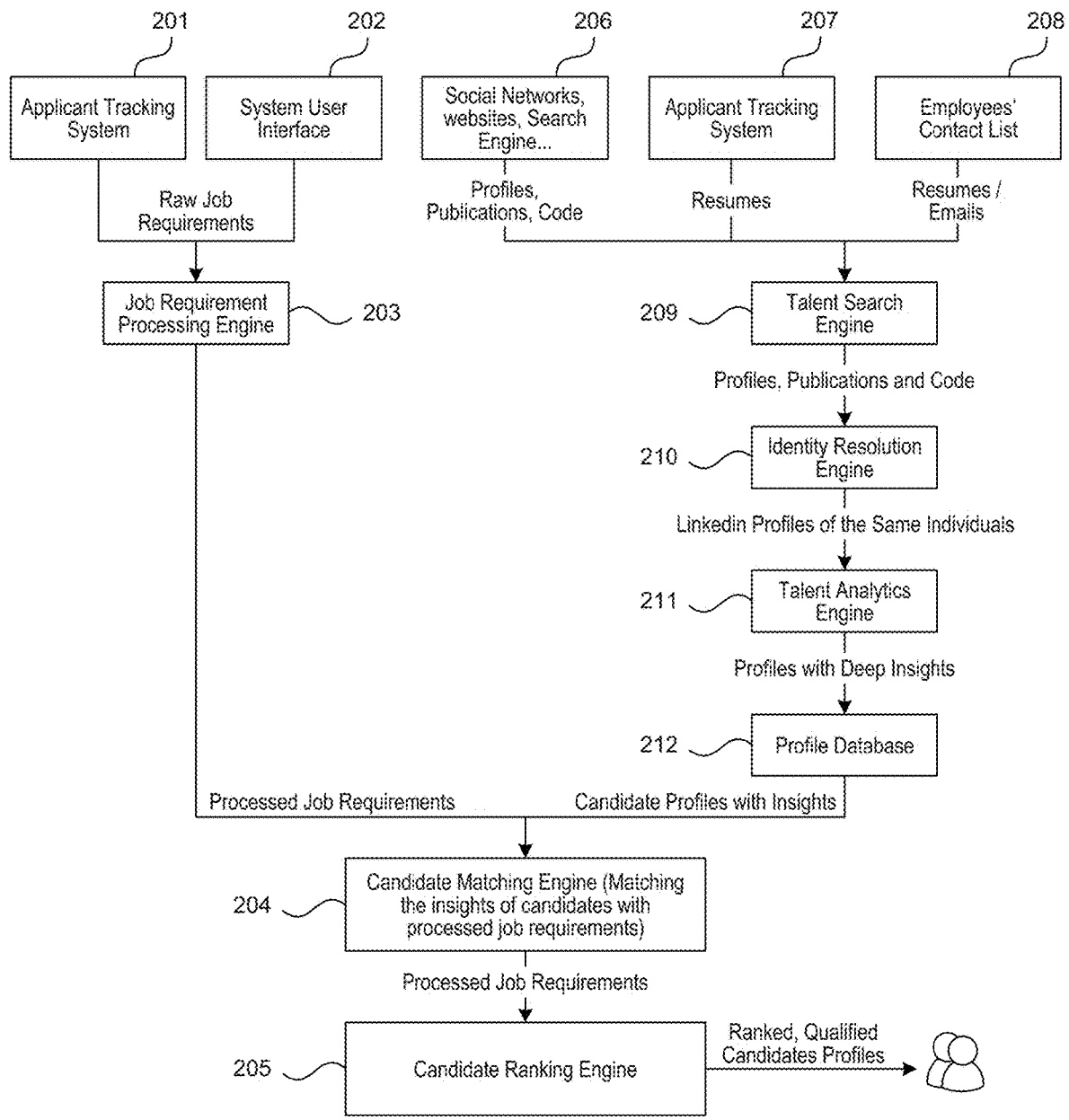
FIG. 2 is a flowchart of a method performed by at least a portion of the system (e.g. implemented on at least a computer or web server) to identify qualified candidates for a specific job (e.g. software engineer) with specific requirements by analyzing a large volume of data, in accordance with some embodiments of the presently disclosed technology.

FIG. 2 illustrates the flow of steps at least a portion of the system takes to identify and rank candidates qualified for a software engineer job. The system comprises of multiple modules working together simultaneously or sequentially to provide accurate results as well as increase the speed of identification.

First, the system, according to some embodiments, can have a textual representation of the job requirement. To accomplish it, the system can be integrated with an external Applicant Tracking System (ATS) (201) to acquire the job description or provide a web user interface (UI) (202) for users to enter the job description manually. The job description can be either paragraphs of text, sentences, or groups of key phrases in a prioritized order. If the job description is in the format of paragraphs of text or sentences, a module (203) with parsing ability, according to some embodiments, can be deployed to remove words that may not represent the job requirements and create groups of key phrases with logic operation(s) within and among each group. Module 203 can also be deployed to analyze and process the job requirements to enhance the searching for qualified candidates.

For example, the following job paragraphs:
Building high-volume, highly available, and distributed server applications, hence you have a portfolio of web apps you've played a key role in shipping
Golang, Java, MySQL (or other RDBMS), and Redis
Must be proficient with React JS, Angular, Node and Javascript
Working with REST APIs (bonus if you've worked with Twitter or Facebook APIs)
Creating automated test suites and ensuring quality in your code
Using front end tools like grunt, bower etc.
Optimizing and applying best practices
can be parsed into:

---

("Golang" AND "JAVA" AND ("MySQL" OR "RDBMS") AND "Redis")
AND
("Rect JS" AND "Angular" AND "Node" AND "Javascript")
AND
("Twitter API" OR "Facebook API" OR "Rest APIs")
AND
("grunt" OR "Bower")

---

In this example, certain phrases are removed to eliminate redundancy and improve accuracy. For example, "high-volume", "highly available", "web apps", "ensuring quality" are removed given that they might not be representing skills. Because the system is used to identify candidates for specific profession(s) such as software developers, these attributes are considered implied among all potential candidates. In some embodiments, a data repository of key phrases is kept and updated constantly to reflect the skill key phrases more relevant to software development jobs. This can be done by integrating with websites (e.g., Stackoverflow.com or Meetup.com) where tags have been created for individual pieces of content. On these sites, each textual tag can represent a key phrase.

If the users enter key phrases through a provided web user interface, the list of key phrases can also be parsed into the same format as above.

In addition to using typical logic operators (e.g., using AND or OR to denote logic relationship(s)), quotation marks " " and parentheses ( ) can be used to describe a phrase or a key phrase and group key phrases together. Some other logic operators (e.g., NOT) can also be used.

If the text was written in languages (e.g., Spanish or Chinese) other than English, translation can be first performed before feeding the key phrases into the system.

The order of the key phrases group can imply the priority of skills. In the example above, "Golang", "Java" and "MySQL" skills can be given higher weight later when performing matching with candidate profiles. If users specify their preference for equal treatment of these skills, the order, according to some embodiments, can be ignored when performing the matching and ranking of qualified candidates.

Once the job description and key phrases entered by users are parsed and processed into groups of key phrases related to professional skills set, professional experiences and education requirement, a subsystem, according to some embodiments, can be used to improve the query key phrases by adding relevant skill key phrases and removing redundant skill key phrases. The subsystem is described in FIG. 3 and discussed in detail below.

While job descriptions are parsed into groups of key phrases, in some embodiments, another portion of the system can simultaneously, at least in part, generate candidate profiles before the matching step takes place. The other portion of the system comprises several modules and/or subsystems to gather textual contents, resolve identities, analyze contents and produce deep insights of candidates.

To produce candidates profiles, the system can synthesize data from several sources including, but not limited to, publicly accessible textual data or source code (206) such as social networks, search engines, online forums, open source software websites, Internet archives, events, resumes submitted by candidates, via sources such as ATS (207) and job application websites, company's career portals, newspapers, recruiting agencies and contact lists as well as resumes submitted internally by contributors (208) via sources such as internal referral programs, contributors' networks. In some embodiments, multiple sources are data are used to generate the insights of a candidate. For example, when a candidate applied for a software engineering job at the company's career website and submitted a resume, the system can also try to find web pages and online publications and from academic publishers of the individual to generate insights. If the system failed to discover additional sources of data for the individual, a clear note can be made to the users that the system failed to gather additional data to avoid penalizing candidates without a large amount of publicly accessible data.

Once data from these sources are gathered, the system can apply one or more modules to gather additional data (209), identify multiple publications of the same individuals (210), synthesize the data and publications into candidate profiles with details relevant to helping users reach hiring decisions (211) and save them into a data repository (212).

Once deep insights that can assist users in making hiring decisions are generated for each candidate profile, the system can deploy a module (204) to execute the matching process between candidate profiles and job requirements. Several matching mechanisms can be used to produce a short-list of matching candidate profiles. Examples include but are not limited to: term frequency-inverse document frequency (TF-IDF), Word2Vec, Bag-of-Words (CBOW), or Skip-Gram. Each matching candidate profile can also be assigned a numeric value denoting its relevance with the job requirements.

After the matching stage, the system can deploy a ranking module (205) to rank the list of qualified candidate profiles before presenting to the end users. The users can choose to view the profiles and forgo the ranking process. However, a ranking system can greatly assist the users focus on the top qualified candidates, thus providing them a personalized hiring experience to significantly increase the odds of successfully recruiting a candidate.

The ranking system is discussed later with reference to FIG. 8. The ranking system can produce a prioritized short list of candidates as the final result to the users. To review the list, the users can directly examine each candidate's profile from a web portal either within the system or through an external system such as ATS that integrated with the system.

Figure 3:
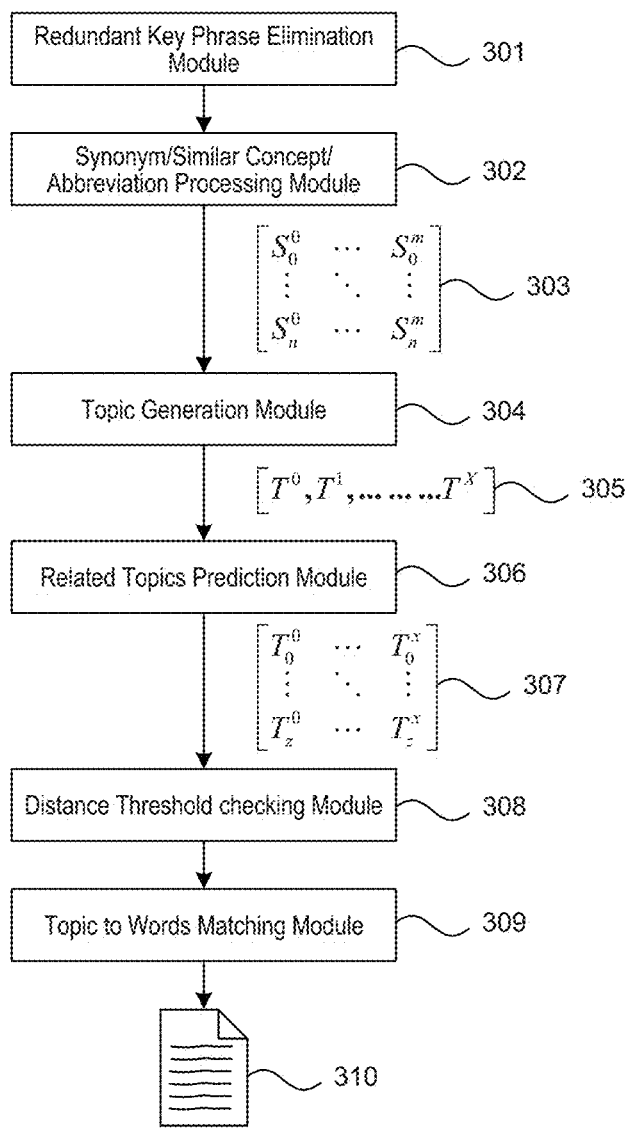
FIG. 3 is a schematic diagram depicting a method performed by at least a portion of the system for converting a group of skill key phrases into matrix and predicting topics for each key phrase, generating topic matrixes and consequently predicting a new key phrases matrix based on the topic matrix, in accordance with some embodiments of the presently disclosed technology.

FIG. 3 depicts an example method the system uses to convert a group of skill key phrases into a matrix and to predict topics for each key phrase per each vector of the matrix. The method can also include generating topic matrixes and consequently predicting a new key phrases matrix based from the topic matrix.

Because job descriptions are often written by users with no technical expertise, it is common to see redundant key phrases appearing in the job description. Such redundancy can adversely impact the matching quality. The redundancy may highly limit the number of candidates qualified.

For example, a skill requirement of a software development engineer is written as;

["Angular" AND "React.JS" AND "Node.js" AND "JAVASCRIPT"]

However, in accordance with applicable software development frameworks, Angular.js, React.js, and Node.js are all written in "JavaScript" language, a programming language.

Many candidates may not explicitly list the key phrase "JavaScript" on their resumes or publications. Given the logic operator AND, which demands the candidates to possess all the listed skills, the matching results are highly limited. Conversely, if the logic operator is OR instead of AND, the impact on the result can be marginally negative. In the example above, if the logic operators are OR's, additional candidates with the skill set "JavaScript" listed on their profiles will be included while none of the candidates that only list "Angular" and "React.js" and "Node.js" as their skills will be eliminated, opposite to the situation when the logic operators are AND's. Thus, the first step is to remove such redundancy based on the logic operator.

The system can deploy a module (301) to reduce the redundancy. According to some embodiments, one method to accomplish the redundancy reduction can be described as follows. The system finds the keywords that are related to all the key phrases in the group. In the example above, "JavaScript" is a prerequisite to developing software code with "Angular" "React.JS" AND "Node.js" frameworks and most software development professionals may not explicitly list all these skills together. Thus, "JavaScript" can be removed if the logic operator is AND.

The following is the result of parsing a job description paragraph, as described in the earlier section

---

("Golang" AND "JAVA" AND ("MySQL" OR "RDBMS") AND "Redis")
AND
("Rect JS" AND "Angular" AND "Node")
AND
("Twitter API" OR "Facebook API" )
AND
("grunt" OR "Bower")

---

The next step can be preparing a skill key phrase matrix to predict additional key phrases. However, if the logic operator within a group of skills is AND, the system can skip processing the group of key phrases. Because additional concepts added to the skill requirements can make the candidate qualification criteria highly narrowed as explained in foregoing paragraphs. For example, if the system predicts that "Postgres" and "Mongodb" are related to "MySQL" and the logic operator is AND, the skill requirement becomes "Postgres" AND "Mongodb" AND "MySQL" AND "RDBMS", which means the candidates must know "Postgres" and know "Mongodb" and "MySQL" and know "RDBMS." This new, transformed skill requirement is narrower (or more limiting) than the intended job requirement: the candidates must know "MySQL" and know "RDBMS".

In the earlier example, the group key phrases after redundancy reduction, according to some embodiments, can become (while other group(s) of skill phrases are withheld from the related skill phrase prediction steps):

---

("MySQL" OR "RDBMS")
AND
("Twitter API" OR "Facebook API" )
AND
("grunt" OR "Bower")

---

Next, the system removes the logic operator OR within each group of key phrases. For instance, the skill key phrases become:

["MySQL", "RDBMS"]
["Twitter API", "Facebook API" ]
["grunt", "Bower"]

Where "[ ]" denotes a group of key phrases and ",", denotes the separator separating phrases within a group.

Once the logic operators are removed, the system, according to some embodiments, can convert the skill key phrases into matrixes made up of vectors. Illustratively, each element in the vector is either a one or a zero, denoting whether specific keywords are present. The length of the vector is the total number of key phrases stored in the key phrase data repository.

For example, if there are a total 3000 key phrases in the data repository, the vector can have a size/length of 3000. Below is an example of the content of the key phrase database:

Key phrase: c++, ID: 0
Key phrase: javascript, ID: 1
...
...
Key phrase: node.js, ID: 1201
Key phrase: angular.js, ID: 1202
...
Key phrase: MySql, ID: 2100
Key phrase: Relational Database, ID: 2101
...
Key phrase: React.js, ID: 2999
A group of skill key phrase ["MySQL", "RDBMS"] can be:
[0, 0, 0, 0, 0, .........1, 1, ...0, 0, 0, 0]

Where the 2100th and 2101st elements are ones and the rest of the elements are zeros.

It should be noted that a key phrase may be expressed differently than a corresponding keyword included in job requirement. For example, key phrase "RDBMS" is written differently from a corresponding keyword "Relational Database," yet the two have the same meaning or otherwise correspond a same element. This can result from the processing performed by a module (302), which matches similar, identical, redundant concepts, affiliated abbreviations, combinations of the same or the like.

The system can perform such transformation for each group of key phrases. The earlier example of skill requirements:

["MySQL", "RDBMS"]
["Twitter API", "Facebook API"]
["grunt", "Bower"]

can be transformed into:
[0, 0, 0, 0, 0, . . . 1, 1, . . . 0, 0, 0, 0]
[0, 0, 0, 0, 0, . . . 1, 0, 0, 1 . . . 0, 0]
[0, 0, 0, 0, 0, . . . 1, 1, 0, 0 . . . 0, 0]

In the example above, the job description is turned into a 3×3000 matrix, where 3 is the number of groups of key phrases input into the module and 3000 is the total number of key phrases the system stored in its database.

Once this step is finished, a skill matrix (303) is created that can be used to generate related topics.

The number of keywords may significantly increase over the years as software development skills evolve. Thus, in some embodiments, reducing the dimension of these vectors can improve processing speed and/or save on data storage cost, in order for the system to predict relevant key phrases efficiently. This dimension reduction and restoration process can be accomplished by using topic generation, a machine learning method. A variety algorithms and methods can be applied to generate topics including but not limited to: Latent Dirichlet allocation (LDA), latent semantic indexing, independent component analysis, probabilistic latent semantic indexing, non-negative matrix factorization, and Gamma-Poisson distribution.

To generate a topic vector from a key phrase vector, the number of topics, according to some embodiments, can be first defined. According to some embodiments, the topic generation module (304) is a program running on a computer. Without prior model, the topic generation module 304 can start with a random number small enough (e.g. a number of 100) and iteratively improve the model by increasing and decreasing the number of topics gradually and having a domain expert examine the accuracy of the prediction.

With the topic generation, each transformed skill phrase vector of the matrix can be fed into the system as an input. Illustratively, the output is a vector, where each element is a decimal depicting the frequency of a specific topic (305). The key phrase vectors (matrices) is consequently fed as input to module (306), which predict topics that are related to these key phrases. The output can be a list of vectors or matrix/matrices of vectors (307) depicting the system's prediction on the similarity between prediction and input. The distance includes but is not limited to: cosine distance, Hamming distance, and Euclidean distance. The system can use a variety of methods to predict the related topics including but not limited to: K-mean clustering, Nearest Neighbor Search, Linear Search, Locality Sensitive Hashing, and Spotify Annoy.

For example, a single 3000-long vector denoting the key phrases
[0, 0, 0, 0, 0, . . . , 1, 0, 0 . . . 0, 0]
is the input and
[0, 0.3, 2.7, 1.1, . . . 4.2, 1.7]
is the output by module 304. The topic vector is 100 in length and each element in the topic vector describes the probability of a topic related to the input key phrases vector.

For instance, if the input of module 306 is a single vector denoting the topics related to a group of keywords:
[0, 0.3, 2.7, 1.1, . . . 4.2, 1.7]
The output by module 306, which denotes the topics related to the input topics (in the form of a topic vector) can be:
Topic Vector 0: [0, 0, 0, 1, . . . 0, 0], Predicted Similarity: 0.98
Topic Vector 1: [0, 0, 0, 0, . . . 1, 0], Predicted Similarity: 0.95
Topic Vector 2: [0, 1, 0, 0, . . . 0, 0], Predicted Similarity: 0.92
Topic Vector 3: [0, 0, 0, 0, . . . 1 . . . 0], Predicted Similarity: 0.87

Topic Vector 4: [0, 0, 0, 0, 1 . . . 0], Predicted Similarity: 0.70

The number of predicted topic vectors can be manually defined by the creator or the administrator of the system. In some embodiments, the administrator or the end users can test different number of predictions to ensure an appropriate number of predictions are generated to bring the best user experience to the end user.

At this stage, a threshold checking, according to some embodiments, can be performed by a portion of the system or module (308) to ensure the closest predictions are counted. The threshold can be manually defined by the creator or administrator of the system or gradually improved by the system itself through a regression processed by examining the end users' interaction with the system. For instance, if the end users kept on finding that the search query is too broad or too many irrelevant candidates are included, the system, according to some embodiments, can automatically set the threshold higher. Conversely, the system can decrease the threshold to include more candidates.

For example, if the threshold is set at 0.9 and the input is:
Topic Vector 0: [0, 0, 0, 1, . . . 0, 0], Predicted Similarity: 0.98
Topic Vector 1: [0, 0, 0, 0, . . . 1, 0], Predicted Similarity: 0.95
Topic Vector 2: [0, 1, 0, 0, . . . 0, 0], Predicted Similarity: 0.92
Topic Vector 3: [0, 0, 0, 0, . . . 1 . . . 0], Predicted Similarity: 0.91
Topic Vector 4: [0, 0, 0, 0, 1 . . . 0], Predicted Similarity: 0.70
Then the output can be:
Topic Vector 0: [0, 0, 0, 1, . . . 0, 0], Predicted Similarity: 0.98
Topic Vector 1: [0, 0, 0, 0, . . . 1, 0], Predicted Similarity: 0.95
Topic Vector 2: [0, 1, 0, 0, . . . 0, 0], Predicted Similarity: 0.92

A portion of the system or a module (309) can look up key phrases corresponding to these predicted topics. This can be achieved by many applicable methods including but not limited to: Latent Dirichlet allocation (LDA), latent semantic indexing, independent component analysis, probabilistic latent semantic indexing, non-negative matrix factorization, and Gamma-Poisson distribution.

For example, if the input is
Topic Vector 0: [0, 0, 0, 1, . . . 0, 0], Predicted Similarity: 0.98
Topic Vector 1: [0, 0, 0, 0, . . . 1, 0], Predicted Similarity: 0.95
Topic Vector 2: [0, 1, 0, 0, . . . 0, 0], Predicted Similarity: 0.92
Topic Vector 3: [0, 0, 0, 0, . . . 1 . . . 0], Predicted Similarity: 0.91
Topic Vector 4: [0, 0, 0, 0, 1 . . . 0], Predicted Similarity: 0.70
The output can be:
[0, 0, 0, 0, 0, . . . 1, 0, 0, 0 . . . 0, 0] Predicted Similarity: 0.98
[1, 0, 0, 0, 0, . . . 0, 0, 0, 0 . . . 0, 0] Predicted Similarity: 0.98
[0, 0, 0, 0, 1, . . . 0, 0, 0, 0 . . . 0, 0] Predicted Similarity: 0.98

Each vector is the same length (e.g. 3000) as the key phrase vector. Each one in the vector denotes the predicted key phrase's relative location to other key phrases. In the example above, the prediction can be the 2107th element, the 1st element and the 5th element. Then the system can look up its key phrase data repository and translate the vector into a textual string.

For example, if the input is:
[0, 0, 0, 0, 0, . . . 1, 0, 0, 0 . . . 0, 0]
The output can be:
"Postgres"

By emulating the reverse look for all topic vectors per every input key phrase vector, a new key phrase matrix can be created.

For example,

["MySQL", "RDBMS"]
["Twitter API", "Facebook API"]
["grunt", "Bower"]

Can now be transformed into

["MySQL", "Relational Database", "Postgres", "Sql Server", "Mongodb"]
["Twitter API", "Facebook API", "Passport Library", "Google API"]
["grunt", "Bower", "NPM", "Docker"]

Logic operator OR is then added back to the strings:

("MySQL" OR "Relational Database" OR "Postgres" OR "Sql Server" OR "Mongodb")
("Twitter API" OR "Facebook API" OR "Passport Library" OR "Google API")
("grunt" OR "Bower" OR "NPM" OR "Docker")

The order of these key phrases can be preserved and used for matching these key phrases with candidate profiles. Illustratively, heavier weight can be given to original key phrase(s). In some embodiments, these key phrases are combined with groups of key phrases that didn't undergo the relevant key phrases processing. Continuing the example used above, the original key phrases:

("Golang" AND "JAVA" AND ("MySQL" OR "RDBMS") AND "Redis")
AND
("Rect JS" AND "Angular" AND "Node")
AND
("Twitter API" OR "Facebook API")
AND
("grunt" OR "Bower")

become:

("Golang" AND "JAVA" AND ("MySQL" OR "Relational Database" OR "Postgres" OR "Sql Server" OR "Mongodb") AND "Redis")
AND
("Rect JS" AND "Angular" AND "Node")
AND
("Twitter API" OR "Facebook API" OR "Passport Library" OR "Google API")
AND
("grunt" OR "Bower" OR "NPM" OR "Docker")

Figure 12:
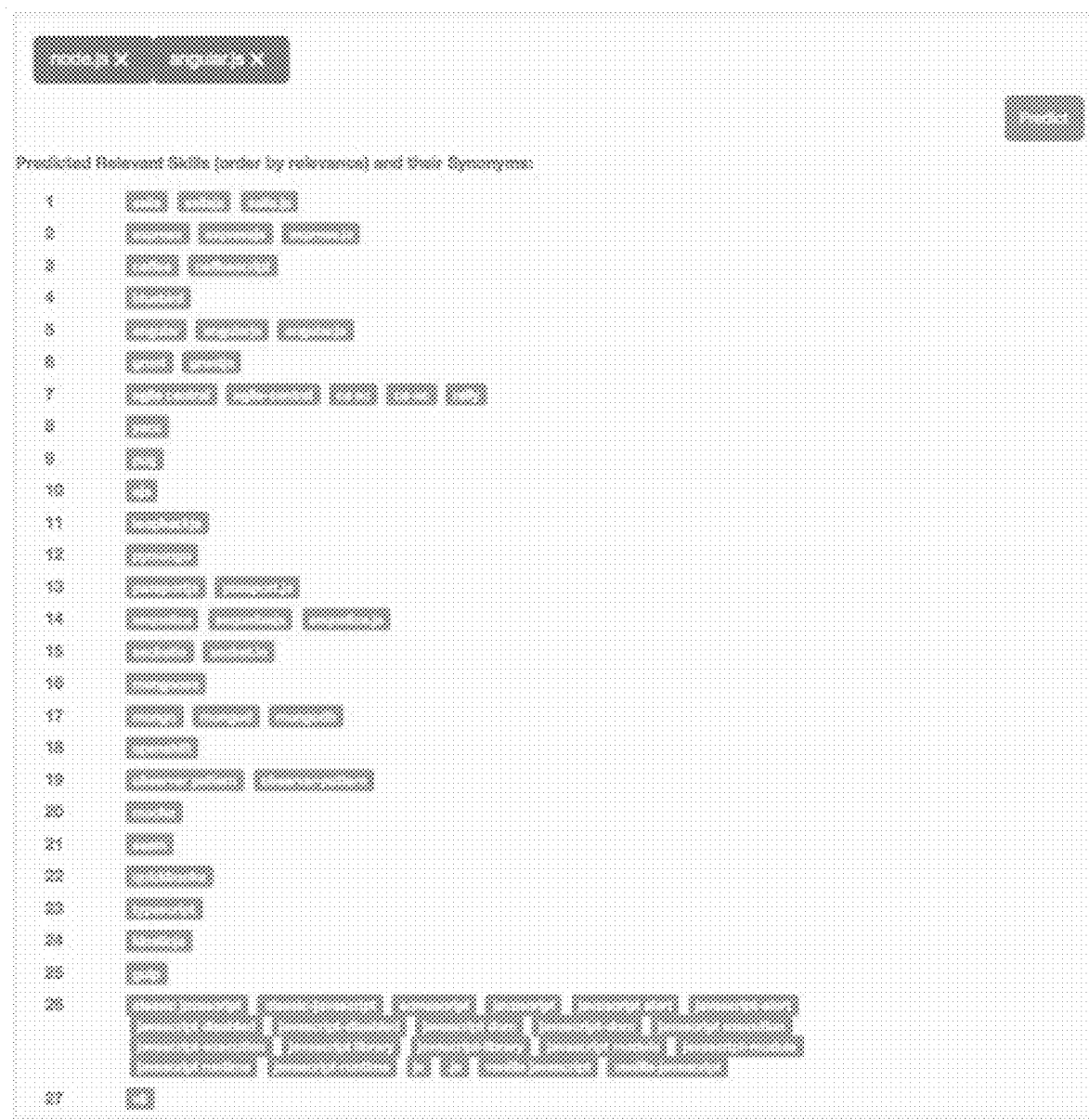
FIG. 12 illustrates an example user interface demonstrating the results of a job requirements processing engine, in accordance with some embodiments of the presently disclosed technology.

These new groups of key phrases (310) can be stored in memory of the computer where the system is executed or in a data repository to be used later for matching. FIG. 12 illustrates an example of a user interface where the system displaying the predicted skills relevant to two inputted skills.

Figure 4A:
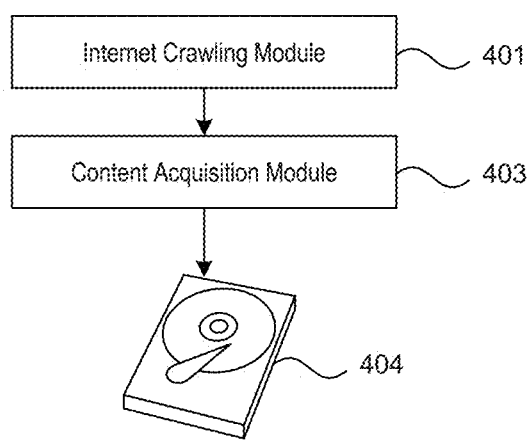
FIG. 4A is a schematic diagram that illustrates a method performed by at least a portion of the system for gathering links/URLS to social profiles, publications for potential candidates that could potentially be added to a data repository in the system, acquiring contents associated with these links/URLS, and storing these contents and links/URLS in a data repository, in accordance with some embodiments of the presently disclosed technology.
Figure 4B:
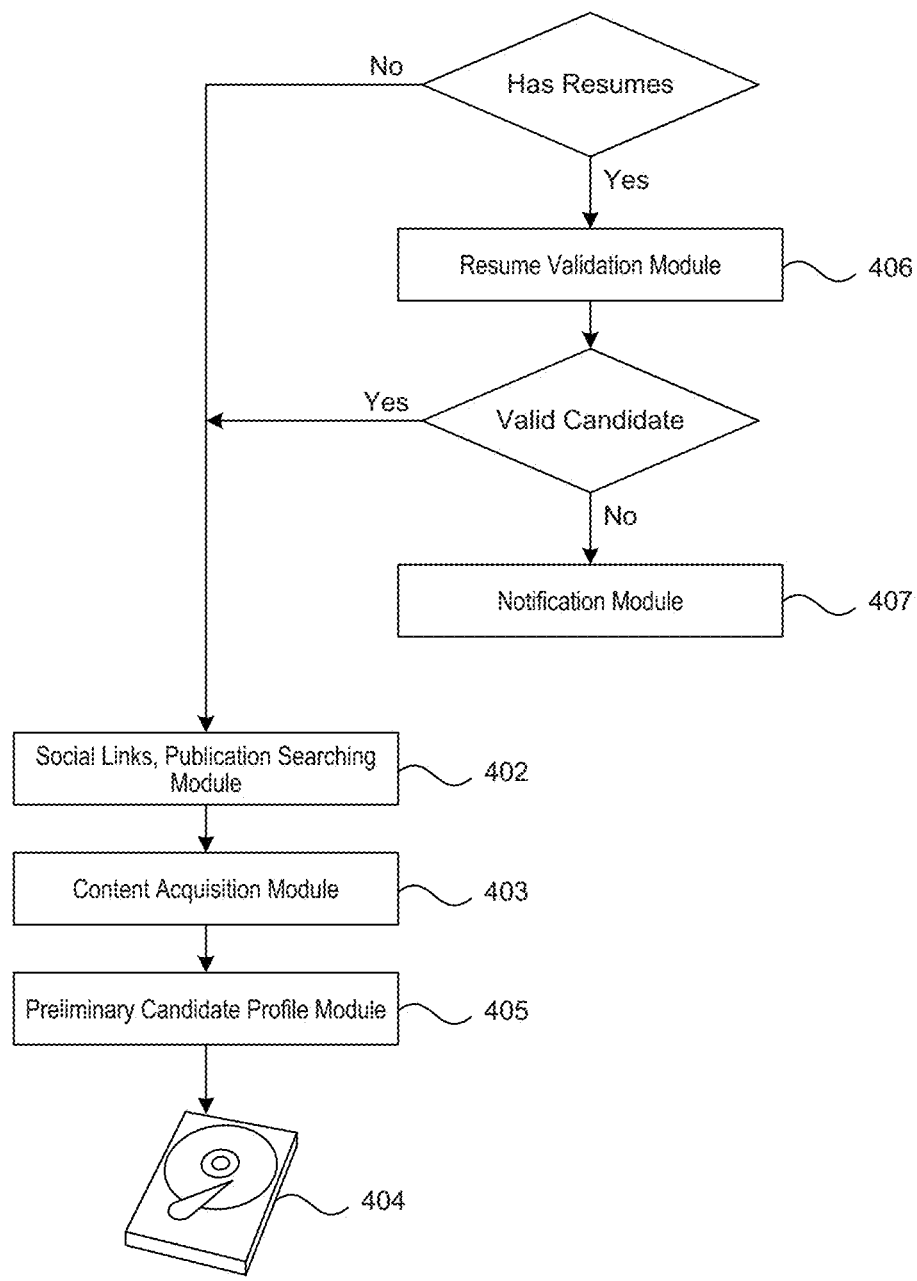
FIG. 4B is a schematic diagram depicting a method performed by at least a portion of the system for gathering links/URLS to social profiles and publications, acquiring contents associated with these links/URLS, and storing these contents and links/URLS in a data repository, in accordance with some embodiments of the presently disclosed technology. Different from the method described with reference to FIG. 4A, where the system can crawl candidates that have no association with the end users and contributors (e.g. employees internal to a hiring entity), the method described in the FIG. 4B can be performed when the specific candidates associated with the users and contributors are passed to the system.

FIG. 4A and FIG. 4B illustrate example methods a portion of the system uses to search and gather multiple sources of data before creating candidate profiles to match with the input job requirements. Two slightly different methods are used and can be referred to as Generic Search described in FIG. 4A and Targeted Search described in FIG. 4B.

Generic Search process, according to some embodiments, could mean the end users simply want to view a list of qualified candidates without providing the system any candidates' resume or contact information as input. Targeted Search process, according to some embodiments, could mean that the end users or the contributors provide the system with the resumes and/or contact information of a list of candidates and want to view a refined list of candidate profiles after the system gathers and analyzes additional data related to the candidates.

FIG. 4A describes the method the system performs to gather data by deploying multiple modules for the Generic Search approach. The first step is to deploy a module (401) that crawls websites on the Internet to discover web pages that are related to software developments as well as contact information on the web pages. The module can deploy single or multiple computers to perform such tasks. For example, Stackoverflow.com can be identified by module 401 as a relevant site, and thus the module can gather links/URLS of all the user profiles (StackOverflow profiles) on Stackoverflow.com and links/URLS of their writing such as questions and answers as well as links/URLS to other social network on their StackOverflow profiles. Another example of module 401's output can be links/URLS to academic papers published on ACM or IEEE websites with authors' names, basic contact information on these papers. The following is an example of the data produced by module 401:

Search approach. According to some embodiments, the method described in FIG. 4B can be similar to that described in connection with FIG. 4A, with some additional steps. The first step is to determine whether the list of candidates provided by the users and contributors have resumes associated with them. If resumes are provided, a module (406) can be deployed to ensure the validity of resumes to prevent fraud or abuse (e.g. resumes created by bots). For example, a user may receive well over 1,000 resumes from its ATS or career portal and yet, only a small portion of the resumes were genuinely written by actual candidates and the rest may come from staffing agencies or individuals with malicious intention. The sheer number may deter the users from going through all the resumes. Thus, a module to filter out these fraudulent/malicious resumes can be incorporated by the system.

According to some embodiments, the module 406 can deploy a variety of methods to detect fraudulent/malicious resumes. Illustratively, the system can leverage a classifier built upon deep learning to label the resumes based on features including but not limited to: file signature, author of the file, style of language, layout of the resumes, number of pages, phone number and frequency of specific words, etc.

Once the module classifies a resume as fraudulent/malicious with a reasonable level of confidence, the system can deploy another module (407) that can notify the users and/or contributors by executing actions including, but not limited to, adding notes/labels to the ATS or web portal where the resumes were originally submitted, sending emails to the users and contributors and removing the resumes from the list of candidates to be considered for the job.

When the list of candidates has no resumes associated with them or a list of candidates' resumes are deemed genuine by module 406, the list of candidates can be passed to a module (402) that search for links/URLS to web sites associated with the candidates including but not limited to social profiles, publications, personal websites, blogs and open source code. The module can deploy a variety of

| Link/URL | https://stackoverflow.com/profile/101 | https://stackoverflow.com/profile/102 | https://ieee.org/paper/301 |
|---|---|---|---|
| Associated Link/URLS | [https://personblog.com, https://stackoverflow.com/posts/111, https://stackoverflow.com/posts/121, https://github.com/johndoe] | [https://blog.com, https://stackoverflow.com/posts/221, https://stackoverflow.com/posts/321] | [https://www.emory.edu/labs/deeplearning] |
| Contact Info | Email: johndoe@gmail.com Phone: 6048909090 | Email: janedoe@gmail.com Twitter: @janedoe | Email: jia@emory.edu |

Once links/URLS are gathered by module 401, the links can be passed onto another module (403) to acquire the content associated with these links. The module can leverage Applicant Programmable Interface (API) of these sites to acquire the content. Alternatively or in addition, module 401 can directly parse the text content on these sites. The acquired content associated with the links/URLS can consequently be saved in a data repository (404).

FIG. 4B describes the method the system performs to gather data by deploying multiple modules for the Targeted services including but not limited to: Fullcontact, Clearbit and Zoominfo, or using web search engine such as Google to discover the links/URLS.

Once the links/URLS are gathered, the system can perform same or similar actions described with reference to FIG. 4A, including deploying module 403 to gather contents associated with the links/URLS. The system can also deploy a module (405) that creates a preliminary profile with multiple links/URLS bundled together. Such a step can help the system avoid unnecessary computation in the Identity Resolution Step. The following is an example of the data produced by module 405

| Profile | 001 | 003 | 007 |
|---|---|---|---|
| Associated Links/URLS | [https://personblog.com (content:xxxxx), https://stackoverflow.com/posts/111 (content:xxxxx), https://stackoverflow.com/posts/121 (content:xxxxx), https://twitter.com/johndoe (content:xxxxx), https://facebook.com/johndoe (content:xxxxx), https://linkedin.com/johndoe (content:xxxxx), https://secondblog.com/john (content:xxxxx)] | [https://blog.com (content:xxxxx), https://stackoverflow.com/posts/221 (content:xxxxx), https://stackoverflow.com/posts/321 (content:xxxxx), https://linkedin.com/jane (content:xxxxx), https://acm.org/papers/909 (content:xxxxx)] | [https://www.emory.edu/labs/deeplearning (content:xxxxx), https://www.linkedin.com/in/jiachen (content:xxxxx), https://www.jiachen.io (content:xxxxx), https://www.medium/@talentful content:xxxxx)] |
| Contact Info | Email: johndoe@gmail.com Phone: 6048909090 Twitter: @johndoe Aboutme: /johndoe Medium: @johndoe | Email: janedoe@gmail.com Twitter: @janedoe Phone: 6509098798 | Email: jia@talentful.ai Twitter: @ichenjia |

Consequently, the data can be stored in a data repository, such as data repository 404 described with reference to FIG. 4A.

The more crawlers on more computers the system employs, the faster the system can gather information. According to some embodiments, the information the system gathers can be categorized into four types: 1) publications (e.g. academic papers and blogs), 2) work product samples (e.g. source code of open source projects hosted on websites such as Github.com or Bitbucket), 3) profiles (e.g. social website profiles and resumes), and 4) visual identifiers (e.g. profile pictures and other pictures displayed under the links). The crawlers can gather these types of information and store the information temporarily in memory and/or in a data repository, for example, based on applicable user agreement of these websites and social networks and the limitation of the computer where the system is stored.

For example, the content the system can gather includes but is not limited to:

Textual contents on social networks profiles, online forums profiles, open source software website profiles
Textual contents of personal websites and blogs
Links/URLS to other social profiles
Source code on open source websites
Authors of academic papers, abstract of the papers, emails, institution names
Resumes with job experience, location, contacts, education Once information is stored, the links/URLS and the related contents can be ready for the identity resolution step.

Figure 5:
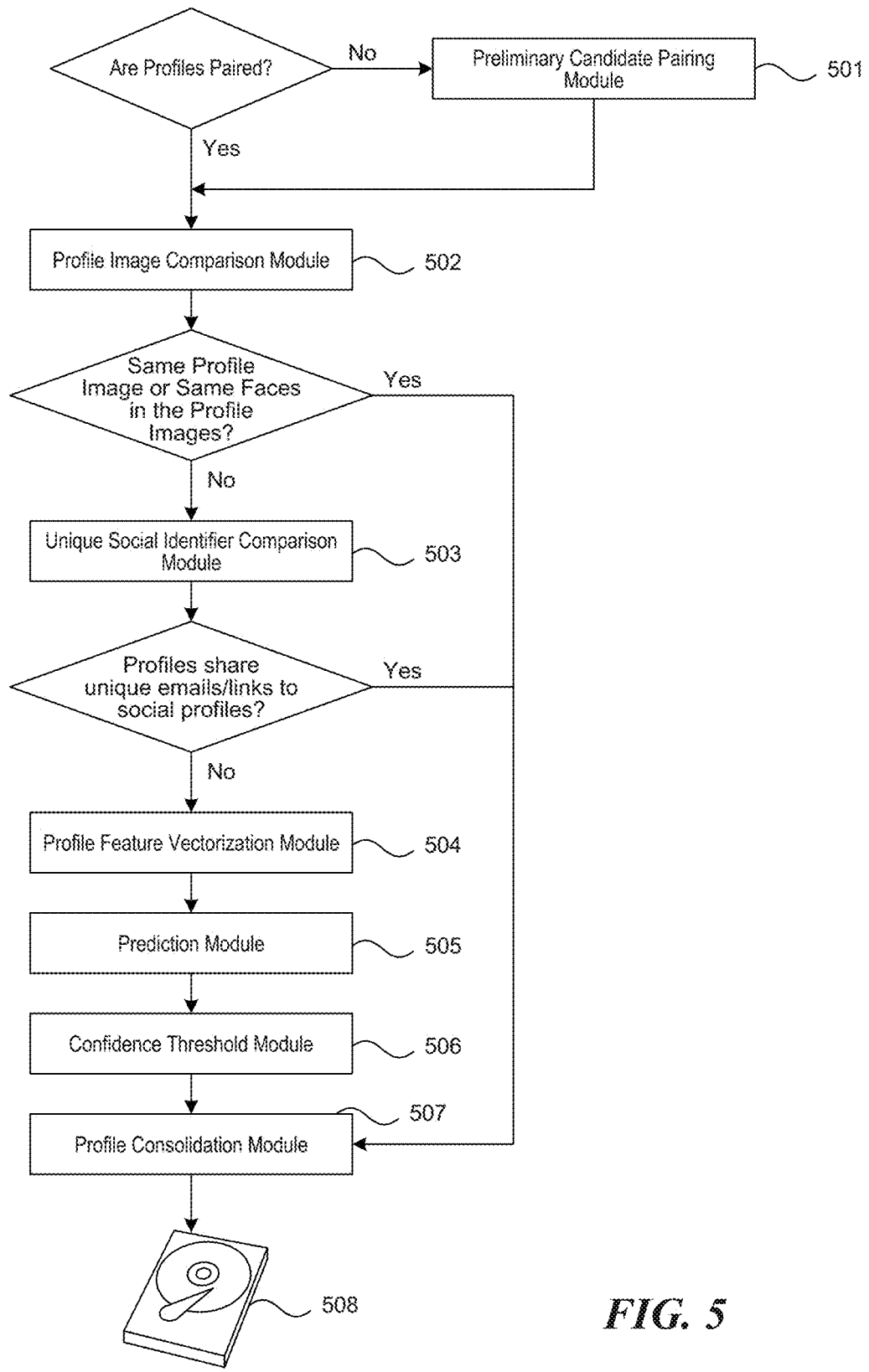
FIG. 5 is a schematic diagram demonstrating a method performed by at least a portion of the system for linking online profiles, publications, resumes of the same individuals together, in accordance with some embodiments of the presently disclosed technology. The method is also referred to as Identity Resolution or Resolving Identities.

FIG. 5 depicts an example method the system can perform to link multiple social profiles, publications, websites, blogs and other contents of the same individual together. The process is called identity resolution or resolving identities. The system is encoded into program code executed on a computer to achieve the best scalability.

In some embodiments, before the system starts linking profiles together, a variety of information under every web link/URLS can be collected and used as indicators for identifying the same individual on multiple social networks, websites and publications. For example, the names and contact information appearing on StackOverflow profiles, Twitter profiles, ACM academic papers, or the like can be collected and used. The information used by the system can include but is not limited to: textual data, location, pictures, names, emails and links/URLS to social network profiles. Processing a large amount of text data and images can be computationally intensive, and thus, incur high costs. The system can implement several steps to address these drawbacks in analyzing the text and images of a portion of profiles.

As discussed above, the input into the systems can include web links/URLS and contents acquired from the links/URLS. For example, below are links/URLS and contents from academic papers, an online forum and an open source website.

| | Link | Content |
|---|---|---|
| Academic Papers | www.univ.edu/papers/20170809 | Title: Performance evaluation of peer-to-peer networks. Author: J. Chen Email: jia@talentful.ai Institution: Talentful Technology Inc. Abstract: The major advantage of the peer-to-peer (P2P) network is scalability. P2P based applications rely on participating peers to contribute their resources for system use. In the case of P2P file sharing networks, peers are required to use their uploading bandwidth to forward file pieces to their neighboring peers. Therefore, unlike client/server based systems in which resources are provided from a few nodes in networks, the size of the resource pool grows with the number of peers. Hence, P2P applications will not fail easily due to a lack of resources. |

-continued

| | Link | Content |
|---|---|---|
| Online forum | www.forum.com/profile/jiachen | Name: Jia Chen<br>Location: Vancouver, Canada<br>Bio: Hi, my name is Jia and I have been programming software over 15 years,<br>Interested Topics: P2P networks, machine learning, artificial intelligence, cpp, philosophy, photography, cycling, startups<br>Recent posts: 1) Which P2P network is the best for live stream on mobile device?<br>2) Running startups full-time or part-time?<br>3) Anyone had experienced using Deeplearning4j for Reinforcement Learning?<br>Profile Image:<br>"https://s3.amazonstorage.com/talentful/learning/profile_pics/hk79zcad" |
| Open source website | www.codehub.com/jiachen | Name: Jia Chen<br>Location: Vancouver, Canada<br>Bio: code money, father and angeler<br>Sample code projects: 1) name: Annoy<br>Language: Python<br>Description: A lightweight nearest neighbor library for topic modeling<br>2) name: Decentralized live streaming on mobile<br>network<br>Language: Java<br>Description: A library written in Java that utilizes mobile devices to live stream video at fast speed<br>Profile image:<br>"https://s3.amazonstorage.com/talentful/learning/profile_pics/hk79zcad" |

The first step can be to deploy a module (501) to pair these links/URLS and contents based on similarity of people's name or other unique ID if the input profiles are not paired yet. To pair profiles, several scenarios of similar names can be considered: 1) first names and last names are exactly the same 2) first names are similar but last names are the same 3) missing either first name or last name while the other part matches and the existing name is very rare among other names.

For example, the following profiles can be considered similar names:
  "Jia Chen" and "Jia Chen"
  "J. Chen" and "Jia Chen"
  "Bill Duffins" and "William Duffins"
  "Shane" and "Shane Shown"
  "Loui-victor" and "Joseph Loui-victor"

According to some embodiments, the system may consider following names different
  "Jia Chen" and "Jia" (too common)
  "Jia Chen" and "Jie Chen" (Do not match)

In the earlier example, where academic paper, online forum profile and open source website profile are listed, two pairs of profiles/web pages/documents/publications instead of three pairs would be saved for further analysis given syllogism. Illustratively, in the example, www.univ.edu/papers/20170809 and www.codehub.com/jiachen form a pair, www.forum.com/profile/jiachen and www.codehub.com/jiachen form another pair, while there is no need to create a pair between www.univ.edu/papers/20170809 and www.codehub.com/jiachen given syllogism.

The system can also consider analyzing two profiles/web pages with similar unique social profile ids or web link. For example: "http://www.twitter.com/ichenjia" and "https://www.github.com/ichenjia" can be considered a potential match of the same individual. However, if the users of the social network lack the privilege to change their profile id/profile links/URLS, such an analysis does not need to be performed. For instance, "https://www.techforum.com/profile/89adf" and "https://www.startupforum/profile/909087" may be deemed different as both "89adf" and "909087" are assigned by the social network randomly.

To compare whether two profiles/web pages (a pair of profiles) are from the same individual, a first step can be to deploy a module (502) to compare visual identifiers (e.g. images on the profiles/web pages). Illustratively, given the system pairs two profiles/web pages if the names of the two individuals listed on them are similar, the conditional probability of a valid identity resolution is significantly increased. Image comparison of visual identifiers can comprise of two steps: 1) whether one image is copied or otherwise derived from another image and 2) if the previous step's result is false, then compare whether the faces on the two images are the same.

A variety of methods can be used to compare images including but not limited to: Key Point matching, Histogram matching, Perceptual Hashing matching, Scale-invariant feature transform. To compare faces in the image, the system can first detect faces in both images. Then a variety of methods can be employed including but not limited to: GaussianFace, PCA, Principal Component Analysis, Fishersface, Hidden Markov Models, Haar Classifiers and Local Binary Patterns.

After the last two steps, if either the images are similar or faces on the images are similar, the system can determine that the two profiles correspond to a same individual and store the links/URLS as well as contents associated with these links/URLS in the final profile database (508).

If no images were found, or neither the image nor the face matches, the system can deploy a module (503) to compare distinct email addresses, links/URLS to other social network profiles listed on the two profiles/web pages. Because the system has already paired the two profiles/web pages based on name similarity, the conditional probability of a false positive is significantly reduced. Some social networks (e.g. Facebook, Twitter, and Linkedin) support profile pages for businesses. The system can check with social networks and ensure the links/URLS are individual profile pages other than group or business profile pages. Once a unique email and links/URLS to other social networks is found on both profiles/web pages, the system can determine that these two profile/web pages correspond to a same person; and consequently, store the links/URLS in the final profile data repository 508 under the individual's profile. If neither common emails or links/URLS to personal social network profiles pages are found on both profiles/web pages, the system can move on to the next step to further resolve the identity.

One of the final steps to resolve the identity can include a module (505) (e.g. including programs running on a computer). The module can apply machine learning to predict whether two profiles/web pages correspond to a same individual. The prediction can be powered by a classifier with previous training based on features including but not limited to: name similarity, distance between two locations listed on the two profile/web pages, similarity between topics listed on the two profile/web pages. The features can be numeric values that quantifiably describe these attributes of profiles. They can be extrapolated by deploying another module (504) that analyzes textual data and produce these numeric values describing the attributes.

Module 504 can first predict the distance between locations listed the two paired profiles. According to some embodiments, the distance between two locations listed on the two profile/web pages can be calculated by first translating location names such as "San Francisco, Calif." into a set of geographic coordinates and then using a Spherical surface formula. According to some embodiments, the similarity between topics listed on two profiles/web pages are calculated by using methods including but not limited to Vector Space Model, Document Similarity, Latent Semantic Analysis. Name similarity can be calculated by using methods including but not limited to: Damerau-Levenshtein Distance, Hamming distance, Levenshtein Distance and Optimal String Alignment.

The numeric values describing the features/attributes of the paired profiles can be fed into the Prediction Module 505. Module 505 can employ a machine learning based classifier, which was trained earlier with labeled data. To train the classifier, matches from earlier steps based on image comparison and unique email, social links/URLS analysis along with matches manually processed can be fed into a binary classifier. The classifier can deploy a variety of methods including but not limited to: Deep Neural Network, Decision Trees, Random Forests, Bayesian Networks, Support Vector Machines, Neural networks, and Logistic Regression. Once the model is trained and tested, the model is ready to be used for predicting positive and negative match. For every prediction the model produced, the model can also produce an associated confidence score. According to some embodiments, the confidence score can range between 0 (no confidence at all) and 1 (absolutely confident).

A separate module (506) can be used by the system to ensure matches, whose confidence score, produced by module 505, surpass a threshold are taken into account. Once all the predicted matches have been examined by module 506, different links and related contents from different social network profiles, web pages, publications etc. can be ready to be consolidated by module 507 and subsequently saved in candidate profile data repository 508. The consolidation can link all matched profiles of the same individuals together and form a consolidated candidate profile for each individual. For example, if the model predicts that Profile A from Stackoverflow.com and Profile B from Github.com are of a same person, and at the same time, Profile B from Github.com and Profile C from Twitter.com, Profile C from Twitter.com and https://www.jiachen.io are of a same person (either through prediction via module 505 or linked together by modules 502 and/or 503), the consolidated candidate profile can include Profile A from Stackoverflow.com, Profile B from Github.com, Profile C from Twitter.com and https://www.jiachen.io as well as contents from these profiles and websites.

After this stage, a data repository (508) of candidate profiles are ready to be matched against job requirements. Illustratively, every candidate profile contains links/URLS to different social profiles, publications, websites, open source website pages, and resumes as well as contents acquired from the links. The system also, according to some embodiments, can perform a consolidation step to combine some basic information together such as name, location, and email addresses. The types of information to be consolidated can depend on the end users' filter preference. For example, end users can filter candidates by location. Thus, location from different social profiles, according to some embodiments, can be consolidated. The system can simply add multiple geographic coordinates to the profiles as possible locations. Alternatively or in addition, the system can choose the location with the latest timestamp as the location. After the consolidation, the candidate profiles are ready to be examined by a portion of the system (with reference to FIG. 6) to generate a list of summaries used to assist the end users to make hiring decisions.

Figure 6:
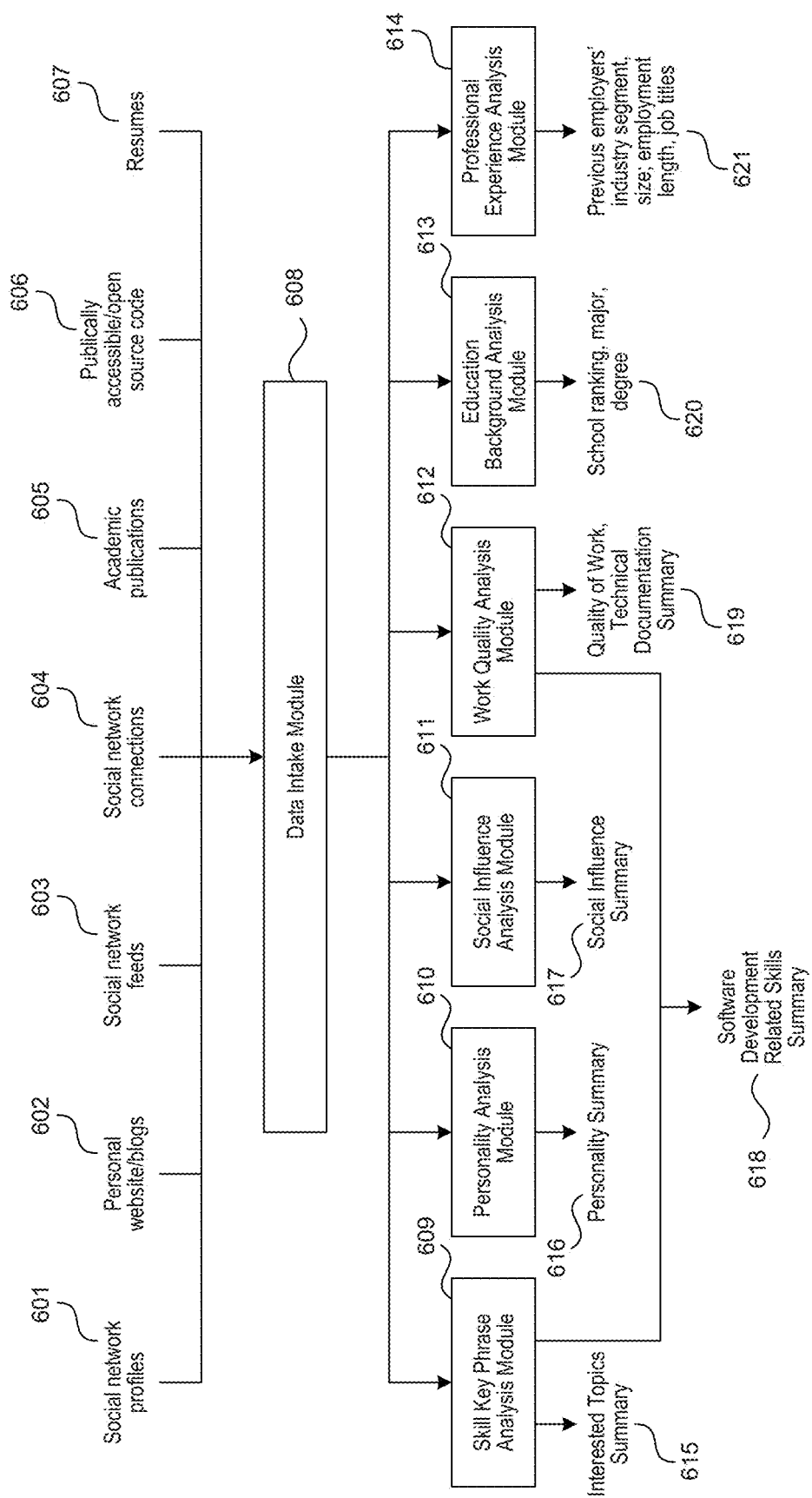
FIG. 6 is a schematic diagram illustrating a process performed by at least a portion of the system for leveraging a wide variety of textual data and computer source code to extrapolate insights to determine the qualification (e.g. personality, interests, skills, social influence, quality of work, education background and professional experiences) of a potential candidate for a specific job (e.g. software engineering job), in accordance with some embodiments of the presently disclosed technology.

FIG. 6 depicts example steps the system takes to perform analysis on candidate profiles to generate concise numeric summary as well as textual summary that can assistant the end users in making a hiring decision. A variety of types of data are used including but not limited to:

Social network profiles (601). For example, a Github.com profile or a Twitter.com profile, etc.

Personal websites and/or blogs (602). For example, https://www.jiachen.io, etc.

Social network feeds (603). For examples, a list of Tweets on Twitter.com or posts on Facebook.com.

Social network connections (604). For example, a list of followers and profiles being followed by Twitter profile @ichenjia Academic publications (605). For example, publications on IEEE or ACM or Google Research with abstract, summary, https://research.google.com/pubs/archive/45999.pdf.

Publicly available work product samples (606). For example, source code/open source code on https://github.com/tensorflow/tensorflow Resumes (607). For example, http://www.lihaoyi.com/Resume/

A candidate profile containing such data can be fed into a module (608) that selects specific types of data and sends over to a variety of modules (609-614) to generate summaries that can assistant the end users in making hiring decisions.

According to some embodiments, the types of modules include but are not limited to:

Key Skill phrase analysis module (609), which synthesizes interested topics (615), summary of professional skill set (618), such as programming languages, software development frameworks and software development tools. For example, 609 could discover that the candidate is interested in C++, JavaScript and have skills related to developing with Python and JavaScript.

Personality analysis module (610), which generates a brief summary of personality (616) by employing additional services including but not limited to IBM Watson. One example of the summary could include the percentile of personality dimensions when comparing to general public in following dimensions: agreeableness, conscientiousness, extraversion, emotional range and openness.

Social influence analysis module (611), which synthesizes a summary of the individual's social outreach and social influence (617). According some embodiments, the summary could be expressed as numeric values depicting the percentile of number of people in the individuals' network and how many people are following the individual on a variety of social media when comparing to other candidate profiles in the database.

Software code analysis module (612), which produces summary regarding the quality of work (619) such as quality of software code and quality of technical documentation, as well as summary of professional skill set (618). According to some embodiments, examples of the summary can include numeric values depicting the percentile describing the average number of stack overflows when the code was run in a virtual environment when comparing to the code found associated with other profiles when running in similar virtual environment. Alternatively, according to other embodiments, the examples can also include numeric values depicting the percentile describing the number of issues reported by other collaborators of the individuals' open source code when comparing to other open source code projects found on the profiles stored in the system. According to some embodiments, to analyze software code, multiple methods can be used simultaneously or sequentially. These methods are stored as programs run on a computer. These methods can employ virtual environments to execute the code to examine the reliability, efficiency, security and maintainability of the code. Alternatively, the system can also take into account the number of bugs/issues reported by the users of open source sites, popularity and number of contributors of the open source projects as indicators of the quality of code. A variety of tools and services can also be deployed by the system to examine the quality of code based on the type of programming languages the source code was written in including but not limited to: Cppcheck, Coccinelle, .Net Compiler Platform, Code Dx and IBM Security AppScan. Another set of tasks the system perform is to examine the quality of technical documentation associated with the source code. The system examines the spelling mistake, grammar error of the documentations along with the coverage, conciseness and readability of the documentations. To examine these dimensions of the documentations, the system can check indicators including but not limited to: 1) whether all functions and classes are mentioned in the documentation, 2) whether there is an abundance of examples in the documentations and 3) the quality of wording in the documentation.

Education background analysis module (613), which generates summary (620) such as the major and degree the individual studied, school ranking and length of studies.

Professional experience analysis module (614), which synthesizes a summary (621) of the individual's past employment history including but not limited to job titles, the industry, sector the individual was previously employed; the size and annual revenue of the individual's past employers.

After these summaries are produced, the profiles can be sent to match with skill requirements processed earlier by the system.

Figure 7:
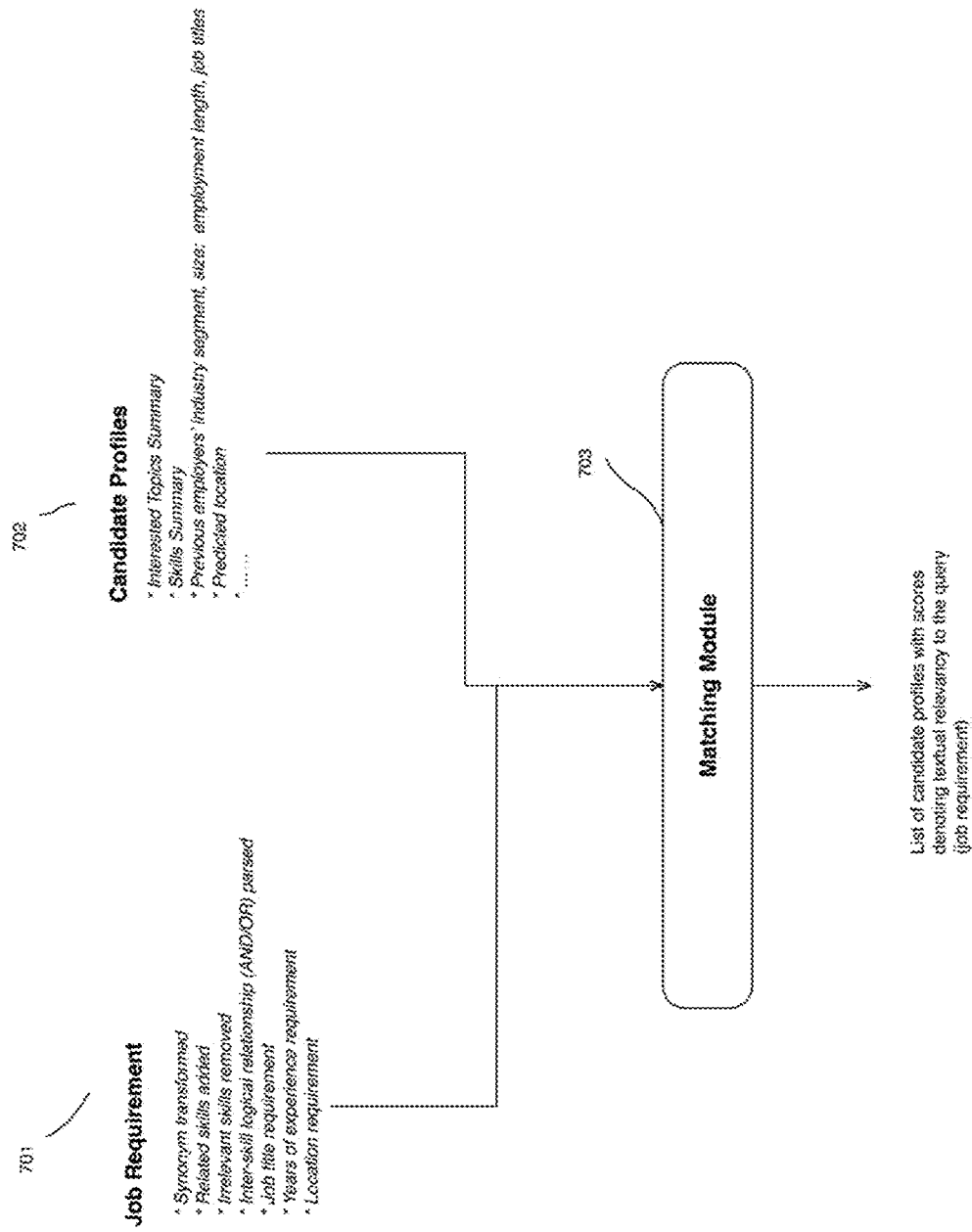
FIG. 7 is a schematic diagram that illustrates a method performed by at least a portion of the system for matching candidates, each of whose profiles containing insights extrapolated by the system described in FIG. 6, with a job requirement that was processed earlier by another system or another portion of the system referenced in FIG. 3, in accordance with some embodiments of the presently disclosed technology.

FIG. 7 depicts the basic steps the system takes to match candidate profiles with specific job requirements. Following are examples of a job requirements (701) and candidate profiles (702) with summaries synthesized earlier module depicted in FIG. 6, which are fed into a module (703) that matches these two inputs and return a list of qualified candidate profiles:

Sample Job Requirement:

Skills Query:
("Golang" AND "JAVA" AND ("MySQL" OR "Relational Database" OR "Postgres" OR "Sql Server" OR "Mongodb") AND "Redis")
AND
("Rect JS" AND "Angular" AND "Node")
AND
("Twitter API" OR "Facebook API" OR "Passport Library" OR "Google API")
AND
("grunt" OR "Bower" OR "NPM" OR "Docker")
Filter:
Location: 100 Miles within Seattle, WA
Education: > Bachelor's Degree
Work Experience: > 3 Years Sample Profile:
Name: Jia Chen
Location: 49.2827° N, 123.1207° W
Programming Languages: CPP, JS, Python, Swift, Objective-C
Software Frameworks: Scikit, Numpy, Node.js, Backbone.js, Tensorflow, Annoy
Software Tools: XCode, Visual Studio, Selenium
School: Emory University (Global Rank 20), University of Regina (Global Ranking 218), Southwest Jiaotong University (Global Ranking 575)
Major: Computer Science (Master of Science), Business Administration (Master of Business Administration), Software Engineering (Bachelor of Engineering)
Total work experience: 19 years
Employer: Talentful Technology Inc. (CEO, 2015—Present, Vancouver, 1-10 employees, Computer Software, Annual Revenue: <$1 MM), SMART Technology (Team Lead, 2008-2011, Calgary, 1000+employees, Computer Hardware, Annual Revenue: $150 MM . . . )
Interested Topics: Software Development, Python, CPP, Machine Learning, Javascript, Node.js, Backbone.JS, Postgres, MySQL, Startup . . .
Social Influence Score: 90th Percentile
Code Quality Score: 75th Percentile Available Resumes, links/URLS and contents:

| Link/URL | Content |
| --- | --- |
| www.univ.edu/papers/20170809 | Title: Performance evaluation of peer-to-peer networks.<br>Author: J.Chen<br>Email: jia@talentful.ai<br>Institution: Talentful Technology Inc.<br>Abstract: The major advantage of the peer-to-peer (P2P) network is scalability. P2P based applications rely on participating peers to contribute their resources for system use. In the case of P2P file sharing networks, peers are required to use their uploading bandwidth to forward file pieces to their neighboring peers. Therefore, unlike client/server based systems in which resources are provided from a few nodes in networks, the size of the resource pool grows with the number of peers. Hence, P2P applications will not fail easily due to a lack of resources. |
| www.forum.com/profile/jiachen | Name: Jia Chen<br>Location: Vancouver, Canada<br>Bio: Hi, my name is Jia and I have been programming software over 15 years.<br>Interested Topics: P2P networks, machine learning, artificial intelligence, cpp, philosophy, photography, cycling, startups<br>Recent posts: 1) Which P2P network is the best for live stream on mobile device?<br>2) Running startups full-time or part-time?<br>3) Anyone had experienced using Deeplearning4j for Reinforcement Learning?<br>Profile Image: "https://s3.amazonstorage.com/talentful/learning/profile_pics/hk79zcad" |
| www.codehub.com/jiaChen | Name: Jia Chen<br>Location: Vancouver, Canada<br>Bio: code money, father and angeler<br>Sample code projects: 1) name: Annoy<br>Language: Python<br>Description: A lightweight nearest neighbor library for topic modeling<br>2) name: Decentralized live streaming on mobile network<br>Language: Java<br>Description: A library written in Java that utilizes mobile devices to live stream video at fast speed<br>Profile Image: "https://s3.amazonstorage.com/talentful/learning/profile_pics/hk79zcad" |

The summaries at the beginning of the profile can be used for filtering out candidates. For example, the location of this individual is within 100 miles of the queried location. The system can employ a variety of systems or methods to match the queried skill requirement and the candidates' insights and summary as well as contents acquired from links/URLS on the profile. A variety of methods and systems can be employed to accomplish the matching including but not limited to: Elasticsearch, Google Search API and TF/IDF matching. The service and methods the system employs to perform the textual matching can be capable of handling different writings and abbreviations of the same concept. Thus, a map can be built prior to employing those services and methods to determine different writings and abbreviations of the same concepts. The services and methods also generate a relevance score to denote the similarity between the profile and the job requirement. The score reflects the closeness between the profile and the skill requirement excluding the filtering requirement given filters are done prior to performing textual matching. When calculating the score, the textual matching system can also be directed to give heavier weight to specific fields on certain types of contents. For example, an open source project written in JavaScript language, according to some embodiments, can be given heavier weight than a Tweet mentioning JavaScript.

Once the module 703 performs the matching, a list of qualified profiles along with the relevance scores can be stored in memory or on a computer to be ranked.

Figure 8:
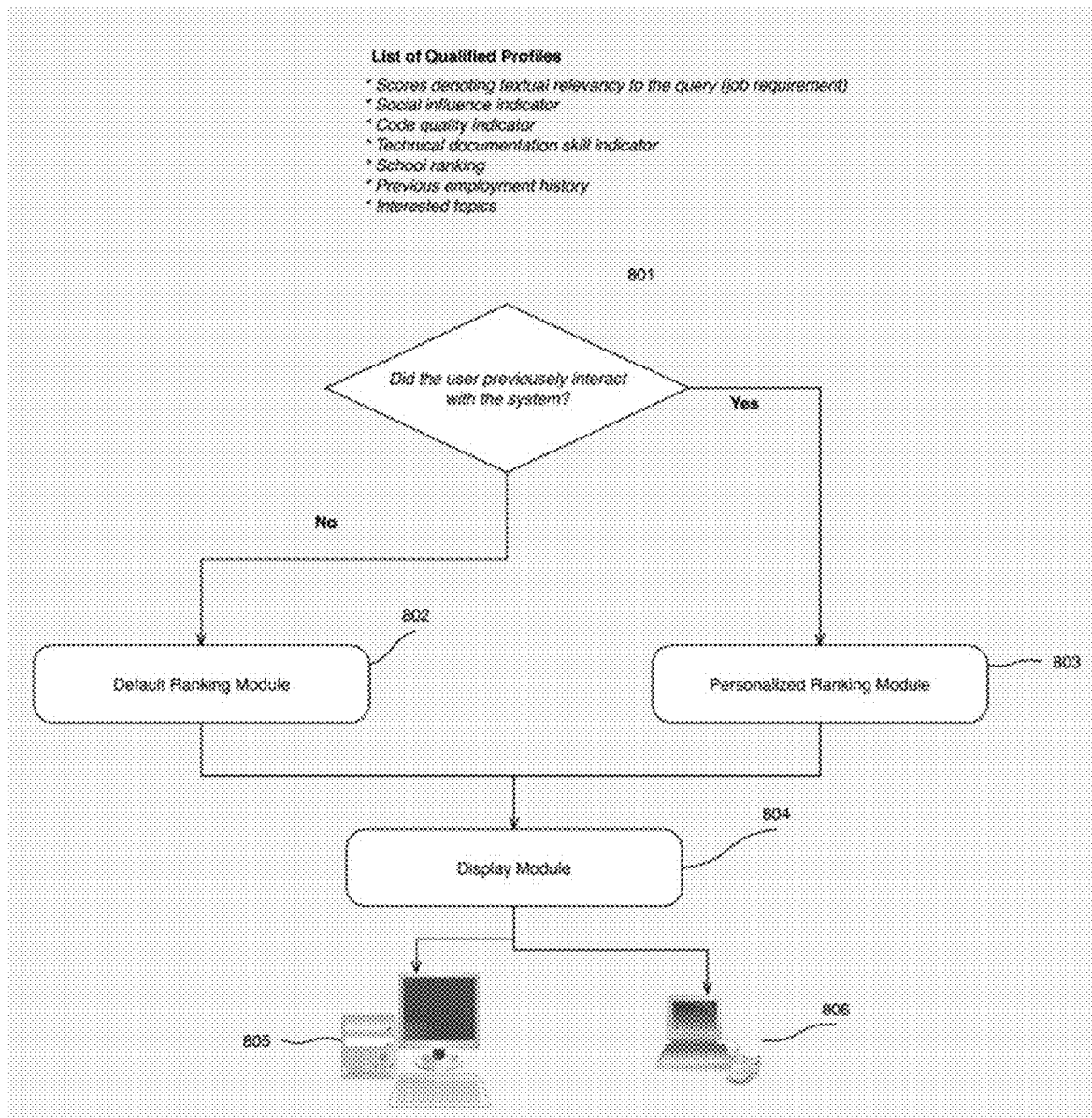
FIG. 8 is a schematic diagram depicting a method performed by at least a portion of the system to sort the ranking of candidate profiles, referred to in FIG. 7, that are qualified for a specific job, in accordance with some embodiments of the presently disclosed technology.

FIG. 8 describes example steps the system takes to rank the qualified profile before presenting to the end users. The system can rank the profiles based on two scenarios: 1) the users never interacted with a list of ranked profiles presented by the system before and 2) the users have previously viewed a list of ranked profiles and the system have collected the usage data.

When no previous interaction is detected, the system can deploy a module (802) that uses a default model to rank the profiles. The model can be calculated by giving weights to the relevance scored provided by module 703 described in FIG. 7, summaries in areas including but not limited to social influence, code quality provided by the module described in FIG. 6, and summaries related to education background score as well as professional experience. The total sum of all the weight assigned to each indicator, according to some embodiments, can add up to 1.0. The system can have multiple strategies to assign weight. For example, the system can assign equal weight to all indicators; or give heavier weight to the relevance score first, then equally divide the rest among the remaining indicators.

The education background score can be calculated by using a variety of methods.

For example:
1. Assign a numeric value to a list of degrees
2. Match the candidate's highest degree to its corresponding value
3. Match the queried degree to its corresponding value
4. Use the numeric value of the candidate's highest degree minus the numeric value of the queried degree Additionally, the system can take into account the relevance between the majors of the candidates studied and the majors of the education experienced queried.

The professional experience summary can also be taken into account when ranking candidate profiles by using a variety of methods including but not limited to valuing the relevance between queried job experiences and candidates' professional experiences. Below is an example of a method the system can use to calculate the score:
1. Set the initial score=0
2. Check whether candidates have past job experience in the same industry as the end users' employer, if yes, then the score=1
3. Check whether the candidates have past job experience working in similar sizes of companies as the end users' employer, if yes, the score adds one
4. Check whether the candidates have more number of work experiences than the demanded number of experiences, if yes, the score adds one.

After calculating a variety of numeric values and using a weighted model to calculate the final score, the system can rank the profiles based on the final scores and display the ranked profiles to the end users.

If the end users have previously interacted with candidates' profiles, the ranking can be performed by a different module (803), which calculates the score(s) to rank the candidate profiles. In some embodiments, the module employs one or more programs running on a computer based on a regression model continuously updated by observing users' interaction with search results, candidate profiles, search preferences, and/or filtering criteria. For example, the end users' browsing activities (e.g. the number of times users view a profile, and time spent on viewing the profile, and number of external web links/URLS the end users clicked on the profile), can be used to indicate the preference of the users when selecting potential candidates for a specific job. To train the regression model, in some embodiments, a score is first calculated from these indicators. For example, the score can be calculated by using following formula:

$$\log(\text{Number of total seconds a profile is viewed}/\text{Number of times a profile is viewed}) + \log(\text{Number of times the profiles is saved})$$

The system can leverage a variety of other indicators depending on what the system is capable of and allowed to keep track of. The score is then used as target variable for training.

The independent variables are the indicators such as relevance scored provided by module 703 described in FIG. 7. The training is valid when there is sufficient amount of user interaction data to gain statistical significance. When insufficient amount of data is used, the model can be biased. To prevent multicollinearity and biases, the system may avoid using multiple indicators that are correlated with each other as independent variables. For example:

"Number of degrees" and "years in graduate level institutions".

Such selections of independent variables may cause multicollinearity and consequently result in a biased model that adversely affect the quality of the ranking.

Once the model is trained, the system can use the model to predict a new numeric value used to rank the profiles and display the ranked profiles to the end users.

The ranked profiles can then be fed to a module (804) that displays the results to the end users through a web user interface (805) and/or adds notes, labels or modifying data in the end users' ATS (806).

Once the ranked profiles are displayed, the system can immediately start tracking the user interaction as described earlier, and continuously update the regression model to progressively improve the quality of the ranking.

Those skilled in the art will appreciate that the components illustrated in FIGS. 1-12 described above may be altered in a variety of ways. For example, the order of the logic may be rearranged, sub-steps may be performed in parallel, illustrated logic may be omitted, other logic may be included, etc.

The techniques described herein can be implemented by, for example, programmable circuitry (e.g. one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g. read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and/or steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g. referenced as "other embodiments") are not mutually exclusive of other embodiments. Moreover, various features are described which may be exhibited by some embodiments and not by others. Similarly, various requirements are described which may be requirements for some embodiments but not other embodiments.

According to some embodiments, there is provided a computer-implemented method for identifying qualified candidates for a software engineer job. The method comprises the steps of: (a) receiving skill requirements from an Application Tracking System (ATS) or having users using a web user interface (UI) to enter skill requirement (b) using a portion of the system to analyze and parse the skill requirements into groups of skill key phrases in prioritized order with logical relationship (AND/OR) associated with each group. (c) using a system to add or remove relevant skill key phrases to make the query more precise and inclusive (if necessary). (d) acquiring a list of profiles from popular social networks where software engineers/developers are active; a list of resumes from ATS (if applicable); publically accessible textual contents such as academic publications and open source code. (e) using a system to connect profiles and resumes of the same individuals together. (f) using a system to analyze textual data from social profiles, publications and resumes to extrapolate insights such as key skills related to software development, interested topics, quality of code and quality of documentation. (g) matching the skill requirements and the extrapolated insights. (h) sort the candidate profiles based on a regression model or weighted formula based on factors such as matching relevancy, social influence, quality of work and job experiences. The ranking of the results can be adjusted by using a variety of variables. For example, a system can study the past hiring history and leverage machine learning to predict which candidates are preferred by the end users.

In some embodiments, the method can be encoded into program code executed on computer servers. The computer servers can form part of a system for managing the entire hiring process that may also comprise: a means to accept resume, a means to connect with candidates such as email or social media messaging and a system to execute the program code.

In some embodiments, the step of using a portion of the system to analyze and parse skill requirements into group of skill key phrases in prioritized order can parsing the text into groups of words, associate each group with a logic operator (AND and OR), assigning a weight to each group of words and another weight to each word within a group to denote the priority of these key phrases.

In some embodiments, the step of using a system to add or remove relevant skill key phrases can comprise multiple modules of the system that accept a set of groups of key phrases, translate groups of key phrases into key phrases vector matrixes, analyze key phrases, predicts topic of key phrases as well as predict key phrases based on topics.

In some embodiments, the step of using a system to connect profiles and resumes of the same individuals together comprises of multiple portions of the system that analyze the similarity among names, images, distance among locations listed on social profiles, publications and resumes and predict the similarity of different profiles of the same individual.

In some embodiments, the step of using a system to analyze textual data to extrapolate insights comprises portions of the system that analyzes textual data, source code to predict individual's personality, interested topics, social influence, software development skills, education background and professional background.

In some embodiments, the step of using a system to sort the candidate profiles comprises multiple portions of the system that a) assign a value for every profile that matches the search query based on factors such as social influence, quality of work, education background and professional experiences b) create regression models based on users' interaction with candidates' profiles and factors mentioned in a). c) assign new values based on regression model mentioned in b).

To the extent any materials incorporated by reference herein conflict with the present disclosure, the present disclosure controls.

I claim:

1. A computer-implemented method comprising:
   obtaining a first plurality of key phrase groups based, at least in part, on textual input that describes at least a requirement for a professional position, wherein individual key phrases of at least a subset of the first plurality of key phrase groups are associated with one another via one or more logical operators;
   converting the first plurality of key phrase groups into a first plurality of vectors defined, at least in part, in accordance with a collection of key phrases;
   generating a set of topics based, at least in part, on the first plurality of vectors;
   generating a second plurality of key phrase groups based, at least in part, on an association between individual topics of the set of topics and the collection of key phrases; and
   identifying documentation associated with one or more candidates for the professional position based, at least in part, on the second plurality of key phrase groups.

2. The method of claim 1, wherein each key phrase group of the first plurality of key phrase groups includes at least one word in a particular language.

3. The method of claim 1, wherein obtaining the first plurality of key phrase groups comprises parsing the textual input to remove one or more words unrelated to a professional requirement.

4. The method of claim 1, wherein obtaining the first plurality of key phrase groups comprises parsing the textual input in accordance with the collection of key phrases.

5. The method of claim 1, wherein the one or more logical operators include at least one of an AND operator, an OR operator, a NOT operator, quotation marks, or parentheses.

6. The method of claim 1, wherein one or more logical operators are used within each key phrase group of the first plurality of key phrase groups.

7. The method of claim 6, further comprising removing at least one redundant key phrase from a key phrase group of the first plurality of key phrase groups based, at least in part, on the one or more logical operators used within the key phrase group.

8. The method of claim 1, wherein the first plurality of vectors forms a base matrix for generating the set of topics.

9. The method of claim 8, wherein generating the set of topics corresponds to a reduction of dimensionality of the base matrix.

10. The method of claim 1, wherein the second plurality of key phrase groups include a larger number of key phrases than the first plurality of key phrase groups.

11. A non-transitory computer-readable medium carrying instructions, which when executed by at least one processor, causes the at least one processor to perform actions comprising:
    obtaining a first plurality of key phrase groups based, at least in part, on textual input that describes at least a requirement for a professional position, wherein individual key phrases of at least a subset of the first plurality of key phrase groups are associated with one another via one or more logical operators;
    converting the first plurality of key phrase groups into a first plurality of vectors defined, at least in part, in accordance with a collection of key phrases;
    generating a set of topics based, at least in part, on the first plurality of vectors;
    generating a second plurality of key phrase groups based, at least in part, on an association between individual topics of the set of topics and the collection of key phrases; and
    identifying documentation associated with one or more candidates for the professional position based, at least in part, on the second plurality of key phrase groups.

12. The non-transitory computer-readable medium of claim 11, wherein the second plurality of key phrase groups is associated with at least one of a priority order or a distribution of weight.

13. The non-transitory computer-readable medium of claim 12, wherein at least one of a relatively higher priority or relatively heavier weight is associated with one or more common key phrases that are included in both the first and second plurality of key phrase groups.

14. The non-transitory computer-readable medium of claim 11, wherein obtaining the first plurality of key phrase groups comprises parsing the textual input in accordance with the collection of key phrases.

15. The non-transitory computer-readable medium of claim 14, wherein the collection of key phrases is updated using at least an external website having content related to the professional position.

16. A system, comprising:
one or more processors; and
memory with instructions stored thereon, which when executed by the one or more processors, cause the system to:
obtain a first plurality of key phrase groups based, at least in part, on textual input that describes at least a requirement for a professional position, wherein individual key phrases of at least a subset of the first plurality of key phrase groups are associated with one another via one or more logical operators;
convert the first plurality of key phrase groups into a first plurality of vectors defined, at least in part, in accordance with a collection of key phrases;
generate a set of topics based, at least in part, on the first plurality of vectors;
generate a second plurality of key phrase groups based, at least in part, on an association between individual topics of the set of topics and the collection of key phrases; and
identify documentation associated with one or more candidates for the professional position based, at least in part, on the second plurality of key phrase groups.

17. The system of claim 16, wherein obtaining the first plurality of key phrase groups comprises parsing the textual input to remove one or more words unrelated to a professional requirement.

18. The system of claim 16, wherein the first plurality of vectors form a base matrix for generating the set of topics.

19. The method of claim 18, wherein generating the set of topics corresponds to a reduction of dimensionality of the base matrix.

20. The method of claim 16, wherein the set of topics is represented by a set of vectors.

* * * * *